US010754021B2

(12) United States Patent
Baheti et al.

(10) Patent No.: US 10,754,021 B2
(45) Date of Patent: Aug. 25, 2020

(54) SYSTEM AND METHOD FOR CONTROLLING OPERATION OF A VEHICLE USING A MILLIMETER-WAVE RADAR SENSOR

(71) Applicant: Infineon Technologies AG, Neubiberg (DE)

(72) Inventors: Ashutosh Baheti, Munich (DE); Reinhard-Wolfgang Jungmaier, Aying (DE); Avik Santra, Munich (DE); Saverio Trotta, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 387 days.

(21) Appl. No.: 15/724,553

(22) Filed: Oct. 4, 2017

(65) Prior Publication Data

US 2019/0101634 A1   Apr. 4, 2019

(51) Int. Cl.
*G01S 13/44* (2006.01)
*G01S 13/536* (2006.01)
(Continued)

(52) U.S. Cl.
CPC .......... *G01S 13/449* (2013.01); *G01S 7/415* (2013.01); *G01S 13/536* (2013.01); *G01S 13/56* (2013.01);
(Continued)

(58) Field of Classification Search
CPC ...... G01S 13/449; G01S 7/415; G01S 13/536; G01S 13/56; G01S 13/584; G01S 13/62;
(Continued)

(56) References Cited

U.S. PATENT DOCUMENTS 4,802,096 A * 1/1989 Hainsworth .......... G01S 17/931
701/301
5,959,570 A * 9/1999 Russell ................ H01Q 25/008
342/70
(Continued)

FOREIGN PATENT DOCUMENTS

EP   0535780 A1 * 4/1993 ............. H01Q 13/10
EP   0660135 A2 * 6/1995 ............. G01S 7/032
(Continued)

OTHER PUBLICATIONS

Dooring Alert Systems, "Dooring Alert Systems Riders Matter" http:\\dooringalertsystems.com, printed Oct. 4, 2017, 16 pages.
(Continued)

*Primary Examiner* — Timothy A Brainard
*Assistant Examiner* — Nuzhat Pervin
(74) *Attorney, Agent, or Firm* — Slater Matsil, LLP

(57) ABSTRACT

An embodiment system may include a first millimeter-wave radar sensor coupled to a driver-side door of a vehicle, and a second millimeter-wave radar sensor coupled to a side-view mirror of the vehicle adjacent to the driver-side door. The first millimeter-wave radar sensor may be configured to produce a first set of radar data indicative of a presence of an object within a first field of view, and the second millimeter-wave radar sensor may be configured to produce a second set of radar data indicative of a presence of the object within a second field of view. The system may further include a processing circuit coupled to the first millimeter-wave radar sensor and the second millimeter-wave radar sensor, and a controller coupled to the processing circuit, the controller being configured to control an operation of the vehicle based on a control signal provided to the controller by the processing circuit.

20 Claims, 14 Drawing Sheets

(51) Int. Cl.
| | |
|---|---|
| *G01S 13/58* | (2006.01) |
| *G01S 13/931* | (2020.01) |
| *G01S 13/56* | (2006.01) |
| *G01S 13/62* | (2006.01) |
| *G01S 13/87* | (2006.01) |
| *G01S 13/42* | (2006.01) |
| *G01S 13/34* | (2006.01) |
| *G01S 7/41* | (2006.01) |
| *B60W 30/095* | (2012.01) |

(52) U.S. Cl.
CPC ............ *G01S 13/584* (2013.01); *G01S 13/62* (2013.01); *G01S 13/87* (2013.01); *G01S 13/931* (2013.01); *B60W 30/0953* (2013.01); *G01S 13/34* (2013.01); *G01S 13/42* (2013.01); *G01S 2013/932* (2020.01); *G01S 2013/9315* (2020.01); *G01S 2013/9321* (2013.01); *G01S 2013/93274* (2020.01)

(58) Field of Classification Search
CPC ........ G01S 13/87; G01S 13/931; G01S 13/34; G01S 13/42; G01S 2013/9321; G01S 2013/9332; G01S 2013/9353; G01S 2013/9385; B60W 30/0953
USPC .......................................................... 342/175
See application file for complete search history.

(56) References Cited

U.S. PATENT DOCUMENTS

| | | | | |
|---|---|---|---|---|
| 8,106,755 | B1* | 1/2012 | Knox | B60R 1/00 340/439 |
| 2002/0158181 | A1* | 10/2002 | Carter | B60R 11/04 248/560 |
| 2002/0158182 | A1* | 10/2002 | Carter | F16F 15/06 248/638 |
| 2002/0190849 | A1* | 12/2002 | Orzechowski | B66F 17/003 340/435 |
| 2003/0176959 | A1* | 9/2003 | Breed | B60N 2/0232 701/36 |
| 2005/0195383 | A1* | 9/2005 | Breed | B60N 2/28 356/4.01 |
| 2007/0205863 | A1* | 9/2007 | Eberhard | B60R 25/2054 340/5.72 |
| 2010/0094508 | A1* | 4/2010 | Kozyreff | B60R 21/0134 701/45 |
| 2010/0225522 | A1* | 9/2010 | DeMersseman | G01S 7/03 342/72 |
| 2010/0283626 | A1* | 11/2010 | Breed | B60N 2/0244 340/8.1 |
| 2011/0079092 | A1* | 4/2011 | Mansour | G01F 1/78 73/862.634 |
| 2011/0291874 | A1* | 12/2011 | De Mersseman | G01S 13/931 342/70 |
| 2012/0154785 | A1* | 6/2012 | Gilliland | G01S 7/4813 356/5.01 |
| 2012/0256405 | A1* | 10/2012 | Itoga | B60R 21/0132 280/735 |
| 2013/0002609 | A1* | 1/2013 | Lim | G06F 3/042 345/175 |
| 2013/0035827 | A1* | 2/2013 | Breed | G01G 19/024 701/45 |
| 2014/0088855 | A1* | 3/2014 | Ferguson | G08G 1/166 701/117 |
| 2014/0098230 | A1* | 4/2014 | Baur | B60R 16/0232 348/148 |
| 2014/0136414 | A1* | 5/2014 | Abhyanker | G05D 1/024 705/44 |
| 2014/0293264 | A1* | 10/2014 | Miyazaki | G01C 3/08 356/4.01 |
| 2015/0268746 | A1* | 9/2015 | Cuddihy | B60K 35/00 345/173 |
| 2015/0269847 | A1* | 9/2015 | Knight | B64C 25/44 701/3 |
| 2016/0223663 | A1* | 8/2016 | Schmalenberg | G01S 17/931 |
| 2017/0135180 | A1* | 5/2017 | Broers | H05B 47/105 |
| 2017/0306684 | A1* | 10/2017 | Baruco | B60R 1/06 |
| 2018/0056784 | A1* | 3/2018 | Virgilio | B60R 21/01516 |
| 2019/0039549 | A1* | 2/2019 | O'Connor | B60R 21/01554 |
| 2019/0080313 | A1* | 3/2019 | Van Wiemeersch | B62D 15/027 |
| 2019/0094877 | A1* | 3/2019 | Smith | B60W 10/04 |

FOREIGN PATENT DOCUMENTS

| | | | | |
|---|---|---|---|---|
| EP | 0660135 A3 | * | 7/1996 | ........... G01S 13/931 |
| EP | 0660135 B1 | * | 4/1999 | ............ G01S 7/032 |
| EP | 1296158 A1 | * | 3/2003 | ........... H01Q 25/008 |
| EP | 1806597 A1 | * | 7/2007 | ........... G01S 7/2926 |
| GB | 2541657 A | * | 3/2017 | ........ G08B 13/1463 |

OTHER PUBLICATIONS

Ventrix, "The Simple Technique That Could Save Cyclists' Lives | Outside Online," https://w1.buysub.com/loc/oum/internalnav, Sep. 19, 2016, 6 pages.

* cited by examiner

SYSTEM AND METHOD FOR CONTROLLING OPERATION OF A VEHICLE USING A MILLIMETER-WAVE RADAR SENSOR

TECHNICAL FIELD

The present disclosure relates generally to a system and method for controlling operation of a vehicle using a millimeter-wave radar sensor.

BACKGROUND

Applications in the millimeter-wave frequency regime have gained significant interest in the past few years due to the rapid advancement in low cost semiconductor technologies such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at 60 GHz, 77 GHz, and 80 GHz and also beyond 100 GHz. Such applications include, for example, automotive radar systems and multi-gigabit communication systems.

In some radar systems, the distance between the radar and a target is determined by transmitting a frequency modulated signal, receiving a reflection of the frequency modulated signal, and determining a distance based on a time delay and/or frequency difference between the transmission and reception of the frequency modulated signal. Accordingly, some radar systems include a transmit antenna to transmit the RF signal, a receive antenna to receive the RF, as well as the associated RF circuitry used to generate the transmitted signal and to receive the RF signal. In some cases, multiple antennas may be used to implement directional beams using phased array techniques. A MIMO configuration with multiple chipsets can be used to perform coherent and non-coherent signal processing, as well.

SUMMARY

In accordance with an embodiment, a system may include a first millimeter-wave radar sensor coupled to a driver-side door of a vehicle, the first millimeter-wave radar sensor being configured to produce a first set of radar data indicative of a presence of an object within a first field of view. The system may also include a second millimeter-wave radar sensor coupled to a side-view mirror of the vehicle adjacent to the driver-side door, the second millimeter-wave radar sensor being configured to produce a second set of radar data indicative of a presence of the object within a second field of view. The system further includes a processing circuit coupled to the first millimeter-wave radar sensor and the second millimeter-wave radar sensor, and a controller coupled to the processing circuit, the first millimeter-wave radar sensor, and the second millimeter-wave radar sensor, the controller being configured to control an operation of the vehicle based on a control signal provided to the controller by the processing circuit. In some embodiments, the processing circuit may be configured to determine whether the object is approaching the driver-side door based on the first set of radar data; and determine whether the object is approaching the side-view mirror based on the second set of radar data.

In accordance with an embodiment, a method may include generating, by a first millimeter-wave radar sensor coupled to a driver-side door of a vehicle, a first set of radar data indicative of a presence of an object within a first field of view. The method further includes generating, by a second millimeter-wave radar sensor coupled to a side-view mirror of the vehicle adjacent to the driver-side door, a second set of radar data indicative of a presence of the object within a second field of view. The method also includes determining, by a processing circuit coupled to the first millimeter-wave radar sensor and the second millimeter-wave radar sensor, whether the object is approaching the driver-side door based on the first set of radar data; and determining, by the processing circuit, whether the object is approaching the side-view mirror based on the second set of radar data. The method additionally includes controlling, by a controller coupled to the processing circuit, the first millimeter-wave radar sensor, and the second millimeter-wave radar sensor, an operation of the vehicle based on a control signal provided to the controller by the processing circuit.

In accordance with an embodiment, an executable program stored on a non-transitory computer readable storage medium includes instructions to: generate, using a first millimeter-wave radar sensor coupled to a driver-side door of a vehicle, a first set of radar data indicative of a presence of an object within a first field of view; generate, using a second millimeter-wave radar sensor coupled to a side-view mirror of the vehicle adjacent to the driver-side door, a second set of radar data indicative of a presence of the object within a second field of view; determine, using a processing circuit coupled to the first millimeter-wave radar sensor and the second millimeter-wave radar sensor, whether the object is approaching the driver-side door based on the first set of radar data; determine, using the processing circuit, whether the object is approaching the side-view mirror based on the second set of radar data; and control, using a controller coupled to the processing circuit, the first millimeter-wave radar sensor, and the second millimeter-wave radar sensor, an operation of the vehicle based on a control signal provided to the controller by the processing circuit.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

In various embodiments, a radar-based detection system is included in a vehicle to determine the presence or absence of an object located outside the vehicle. In some embodiments, the object may be an animate object (e.g. a human) that is mobile or stationary. In other embodiments, the object may be an inanimate object (e.g. controlled by a human) that is mobile (e.g. a bicycle, a motorcycle, or another vehicle). In yet other embodiments, the object may be an inanimate object that is stationary (e.g. a wall or a stationary vehicle). The radar-based detection system may control an operation of the vehicle based on a determination, by the radar-based detection system, of whether an object is located outside the vehicle.

Advantages of the embodiment radar-based detection system include, for example, the ability of the radar-based detection system to alert an occupant of the vehicle that an object is located outside the vehicle and to intervene, for example, to mitigate or prevent harm to the occupant, the vehicle, and the object. Such intervention by the radar-based detection system may be accomplished by controlling an operation of the vehicle, examples being locking or unlocking the vehicle's doors (e.g. to prevent harm to the occupant, the object, and the vehicle), deploying the vehicle's airbags (e.g. to mitigate or prevent harm to the occupant), alerting an emergency response team in an event of an impending collision with the object (e.g. to mitigate or prevent harm to the occupant, the object, and the vehicle), or a combination thereof. The embodiment radar-based detection system is also independent of human perception, lighting conditions, and changes in environmental conditions (e.g. humidity or weather) since radar-based sensing is employed by the radar-based detection system. The embodiment radar-based detection system is also configured to perform long-range detection of objects situated outside the vehicle so as to provide sufficient time for the radar-based detection system to provide an alert to the occupant of the vehicle and to intervene by controlling the vehicle's operation, if necessary.

Figure 1A:
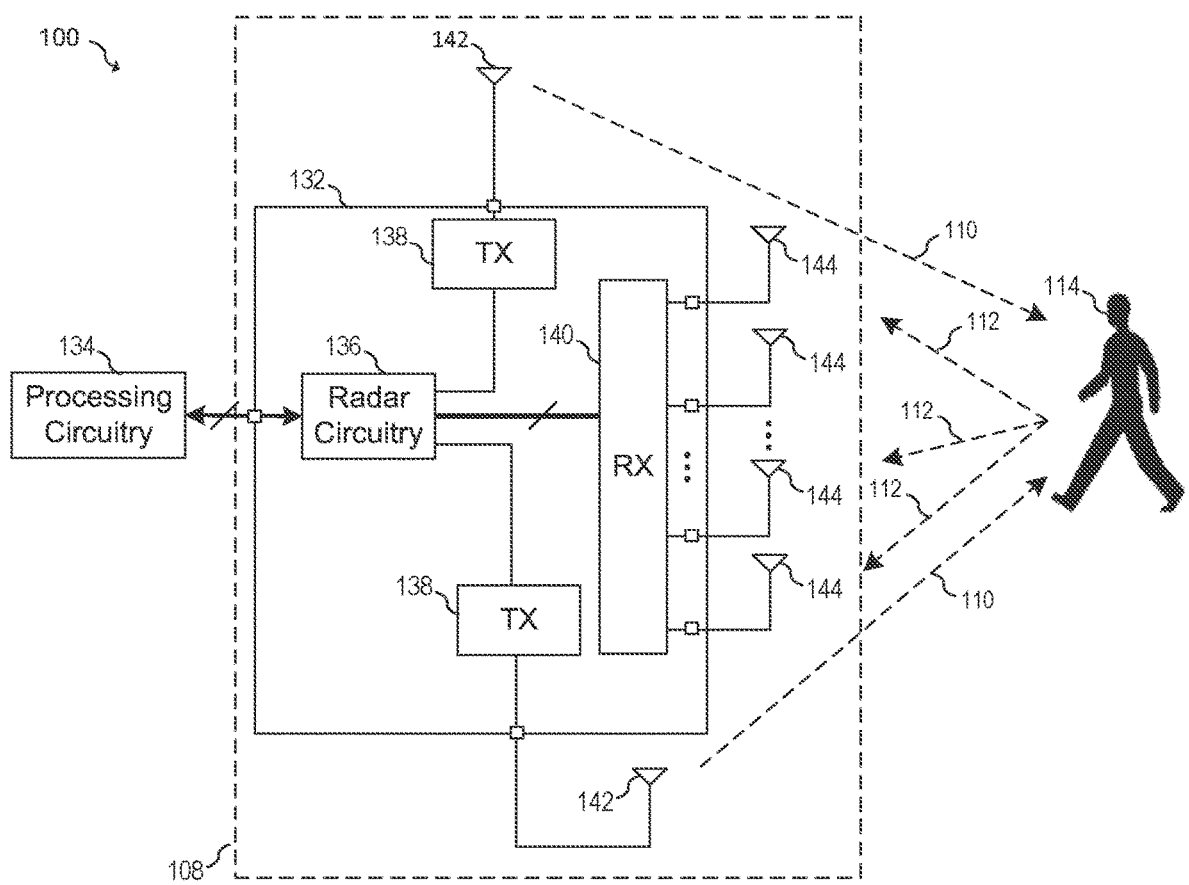
FIG. 1A illustrates a block diagram of a radar-based detection system that includes a millimeter-wave radar sensor and processing circuitry, in accordance with an embodiment.

FIG. 1A illustrates a block diagram of a radar-based detection system 100 that includes a millimeter-wave radar sensor 108 and processing circuitry 134, in accordance with an embodiment. It is noted that the radar-based detection system 100 may be housed within a vehicle, as described below in reference to FIGS. 2A to 2E. The radar-based detection system 100 may be configured to detect the presence or absence of an object 114 located outside the vehicle. The object 114 may be in proximity to the vehicle housing the radar-based detection system 100. In some scenarios, the object 114 may be approaching the vehicle housing the radar-based detection system 100. It is noted that while object 114 is depicted in FIG. 1A as being a pedestrian, the radar-based detection system 100 is configured to determine the presence or absence of other types of objects, examples being cyclists, other vehicles, and other types of animate or inanimate objects, whether mobile or stationary. The radar-based detection system 100 may control an operation of the vehicle it is housed in based on a determination by the radar-based detection system 100 of whether the object 114 is approaching the vehicle, located too close to the vehicle, or a combination thereof.

During operation, the radar-based detection system 100 transmits RF signals 110 into a region of space (e.g. three-dimensional space) in which the object 114 is located. The object 114 reflects the transmitted RF signals 110 and the radar-based detection system 100 receives reflected RF signals 112. These reflected RF signals 112 are processed by radar-based detection system 100 to determine the position of the object 114 (e.g. distance of the object 114 from the vehicle) and/or the motion of object 114 (e.g. velocity of the object 114).

The millimeter-wave radar sensor 108 of the radar-based detection system 100 may be implemented, for example, using a two-dimensional mm-wave phase-array radar that measures the position and relative speed of the object 114. The mm-wave phase-array radar transmits and receives signals in the 20 GHz to 80 GHz range. Alternatively, frequencies outside of this range may also be used. In some embodiments, such as in the example of FIG. 1A, the millimeter-wave radar sensor 108 includes radar front-end circuit 132, which may operate as a frequency modulated continuous wave (FMCW) radar sensor having multiple transmit and receive channels.

Radar front-end circuit 132 transmits and receives radio signals for detecting the object 114 in three-dimensional space. The received reflected RF signal 112 is downconverted by radar front-end circuit 132 to determine beat frequency signals. These beat frequency signals may be used to determine information such as the location, speed, angle, etc., of the object 114 in three-dimensional space. In various embodiments, radar front-end circuit 132 is configured to transmit incident RF signals 110 via transmit antennas 142 and to receive reflected RF signals 112 via receive antennas 144. Radar front-end circuit 132 includes transmitter front-end circuits 138 coupled to transmit antennas 142 and receiver front-end circuit 140 coupled to receive antennas 144.

During operation, transmitter front-end circuits 138 may transmit RF signals 110 one at a time or simultaneously. While two transmitter front-end circuits 138 are depicted in FIG. 1A, it should be appreciated that radar front-end circuit 132 may include fewer or greater than two transmitter front-end circuits 138. Each transmitter front-end circuit 138 includes circuitry configured to produce the incident RF signals 110. Such circuitry may include, for example, RF oscillators, upconverting mixers, RF amplifiers, variable gain amplifiers, filters, transformers, power splitters, and other types of circuits.

Receiver front-end circuit 140 receives and processes the reflected RF signals 112 from the object 114. As shown in FIG. 1A, receiver front-end circuit 140 is configured to be coupled to four receive antennas 144, which may be configured as a 2×2 antenna array. In alternative embodiments, receiver front-end circuit 140 may be configured to be coupled to greater or fewer than four antennas, with the resulting antenna array being of various n×m dimensions depending on the specific embodiment and its specifications. Receiver front-end circuit 140 may include, for example, RF oscillators, upconverting mixers, RF amplifiers, variable gain amplifiers, filters, transformers, power combiners and other types of circuits.

Radar circuitry 136 provides signals to be transmitted to transmitter front-end circuits 138, receives signals from receiver front-end circuit 140, and may be configured to control the operation of radar front-end circuit 132. In some embodiments, radar circuitry 136 includes, but is not limited to, frequency synthesis circuitry, upconversion and down-conversion circuitry, variable gain amplifiers, analog-to-digital converters, digital-to-analog converters, digital signal processing circuitry for baseband signals, bias generation circuits, and voltage regulators.

Radar circuitry 136 may receive a baseband radar signal from processing circuitry 134 and control a frequency of an RF oscillator based on the received baseband signal. In some embodiments, this received baseband signal may represent a FMCW frequency chip to be transmitted. Radar circuitry 136 may adjust the frequency of the RF oscillator by applying a signal proportional to the received baseband signal to a frequency control input of a phase locked loop. Alternatively, the baseband signal received from processing circuitry 134 may be upconverted using one or more mixers. Radar circuitry 136 may transmit and digitize baseband signals via a digital bus (e.g., a USB bus), transmit and receive analog signals via an analog signal path, and/or transmit and/or receive a combination of analog and digital signals to and from processing circuitry 134.

Processing circuitry 134 acquires baseband signals provided by radar circuitry 136 and performs one or more signal processing steps to evaluate them. In an embodiment, processing circuitry 134 acquires a baseband signal that represents the beat frequency signals. The signal processing steps may include performing a fast Fourier transform (FFT), a short-time Fourier transform (STFT), target classification, machine learning, and the like. Results of the signal processing steps are used to determine and perform an action on the vehicle that houses the radar-based detection system 100. In addition to processing the acquired baseband signals, processing circuitry 134 may also control aspects of radar front-end circuit 132, such as the transmissions produced by radar front-end circuit 132.

The various components of the radar-based detection system 100 may be partitioned in various ways. For example, radar front-end circuit 132 may be implemented on one or more RF integrated circuits (RFICs), antennas 142 and 144 may be disposed on a circuit board, and processing circuitry 134 may be implemented using a processor, a microprocessor, a digital signal processor and/or a custom logic circuit disposed on one or more integrated circuits/semiconductor substrates. Processing circuitry 134 may include a processor that executes instructions stored in a non-transitory memory to perform the functions of processing circuitry 134. In some embodiments, however, all or part of the functionality of processing circuitry 134 may be incorporated on the same integrated circuit/semiconductor substrate on which radar front-end circuit 132 is disposed.

In some embodiments, some or all portions of radar front-end circuit 132 may be implemented in a package that contains transmit antennas 142, receive antennas 144, transmitter front-end circuits 138, receiver front-end circuit 140, and/or radar circuitry 136. In some embodiments, radar front-end circuit 132 may be implemented as one or more integrated circuits disposed on a circuit board, and transmit antennas 142 and receive antennas 144 may be implemented on the circuit board adjacent to the integrated circuits. In some embodiments, transmitter front-end circuits 138, receiver front-end circuit 140, and radar circuitry 136 are formed on a same radar front-end integrated circuit (IC) die. Transmit antennas 142 and receive antennas 144 may be part of the radar front-end IC die, or may be separate antennas over or adjacent to the radar front-end IC die. The radar front-end IC die may further include conductive layers, such as redistribution layers (RDLs), used for routing and/or for the implementation of various passive or active devices of radar front-end circuit 132. In an embodiment, transmit antennas 142 and receive antennas 144 may be implemented using the RDLs of the radar front-end IC die.

Figure 1B:
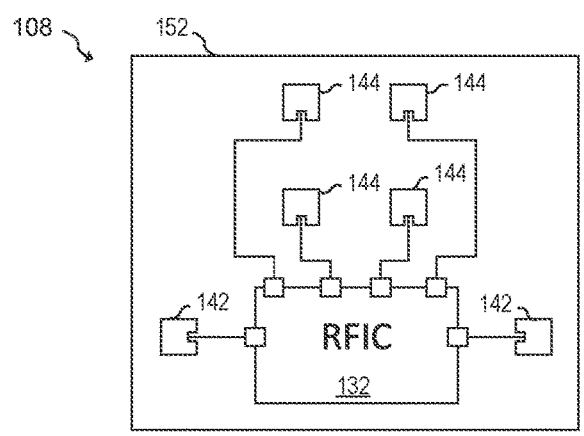
FIGS. 1B and 1C illustrate plan views of a millimeter-wave radar sensor 108 implemented as an RFIC coupled to transmit and receive antennas, in accordance with some embodiments.
Figure 1C:
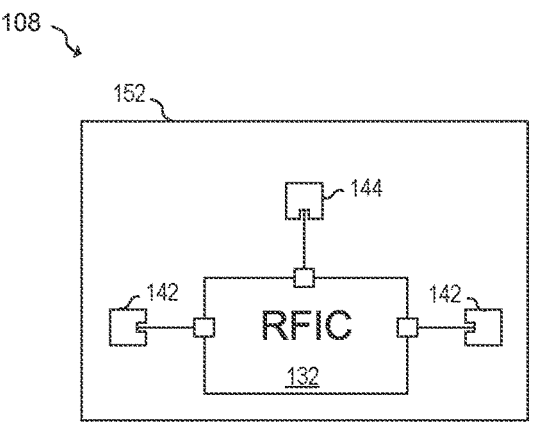

FIG. 1B illustrates a plan view of millimeter-wave radar sensor 108 that includes radar front-end circuit 132 implemented as an RFIC coupled to transmit antennas 142 and receive antennas 144 implemented as patch antennas disposed on or within substrate 152. In some embodiments, substrate 152 may be implemented using a circuit board on which radar front-end circuit 132 is disposed and on which transmit antennas 142 and receive antennas 144 are implemented using conductive layers of the circuit board. Alternatively, substrate 152 represents a wafer substrate on which one or more RDLs are disposed and on which transmit antennas 142 and receive antennas 144 are implemented using conductive layers on the one or more RDLs. It should be appreciated that the implementation of FIG. 1B is just one of many ways that embodiment millimeter-wave radar sensor 108 may be implemented. For example, FIG. 1C illustrates another embodiment where the millimeter-wave radar sensor 108 is implemented using two transmit antennas 142 and one receive antenna 144.

Figure 2A:
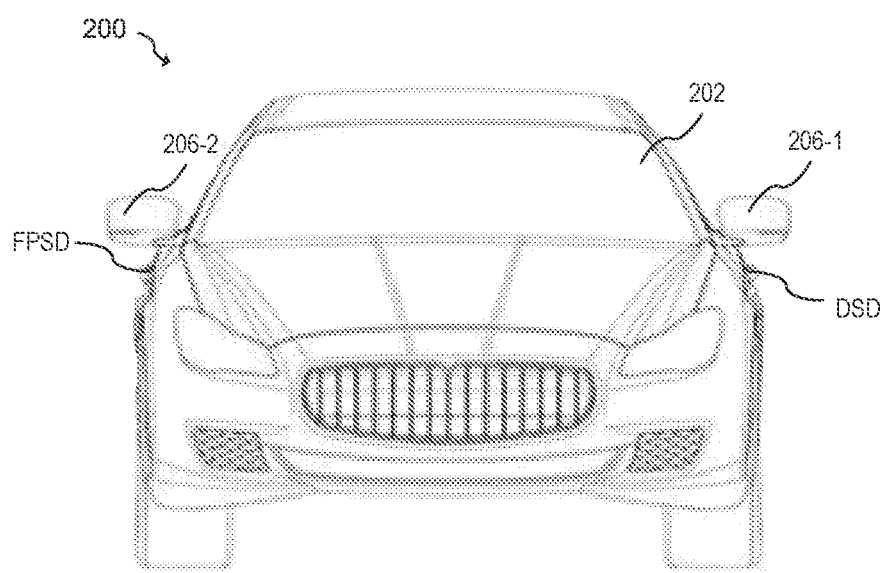
FIGS. 2A to 2C show various views of a vehicle including a plurality of millimeter-wave radar sensors, a controller, and processing circuitry, which are configured to control an operation of the vehicle, in accordance with an embodiment.
Figure 2B:
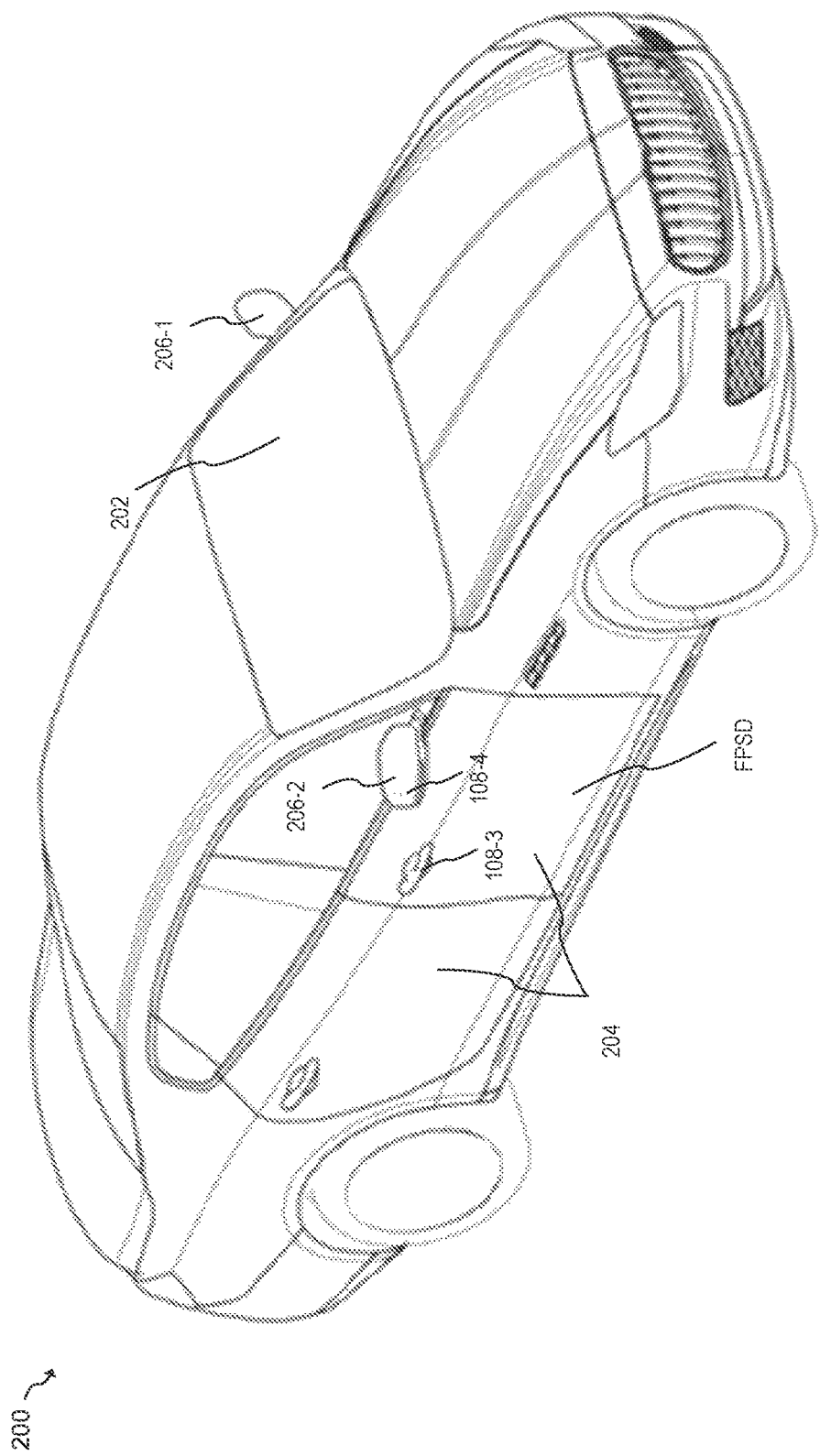
Figure 2C:
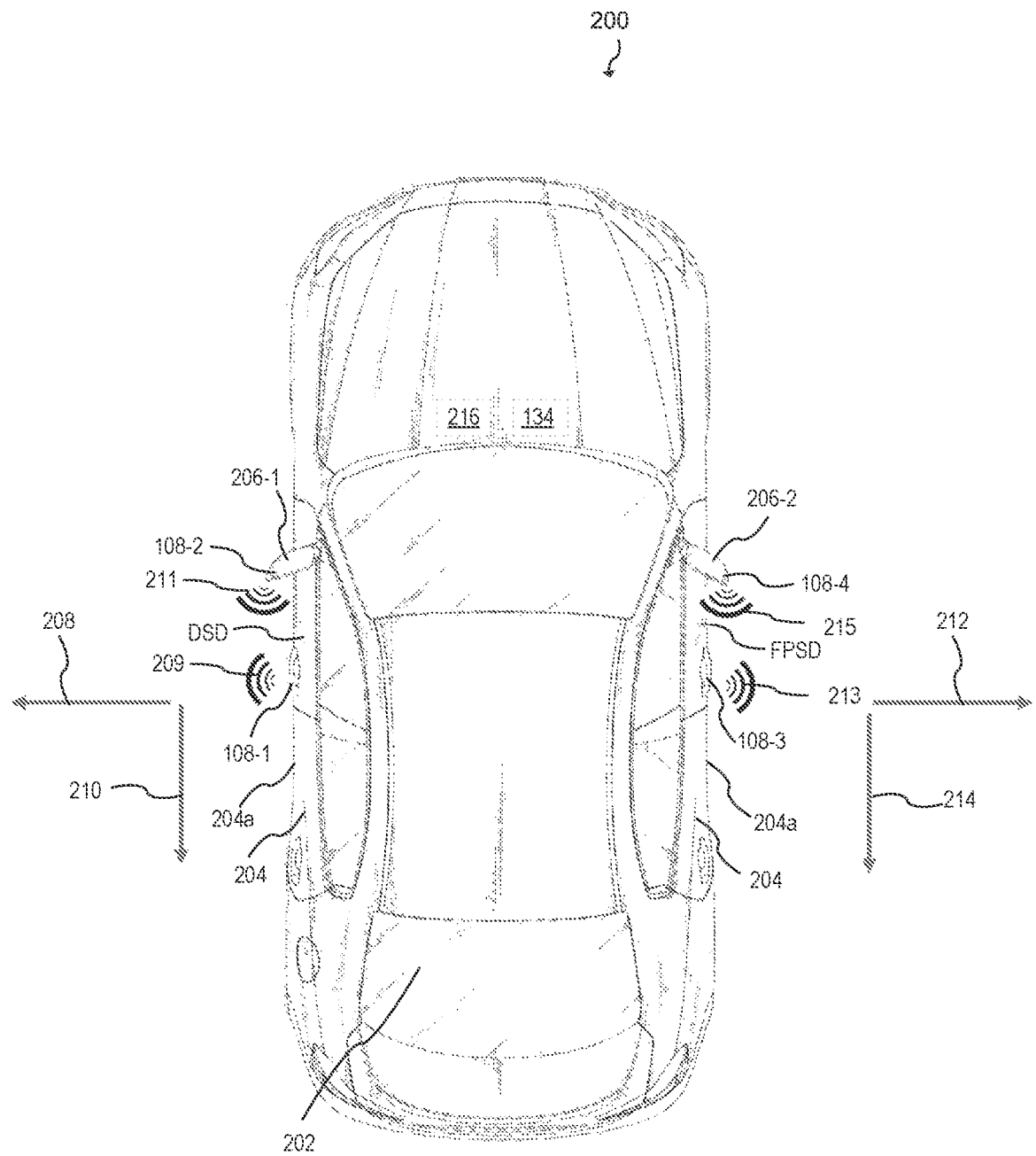

As mentioned above, the radar-based detection system 100 may be housed in a vehicle and may be configured to control an operation of the vehicle based on a determination, by the radar-based detection system 100, of whether the object 114 is approaching the vehicle, located too close to the vehicle, or a combination thereof. An illustration of such an implementation is shown in FIGS. 2A to 2C, which illustrate various views of a vehicle 200 including a plurality of millimeter-wave radar sensors 108-1 to 108-4, a controller 216, and the processing circuitry 134. The system formed by the plurality of millimeter-wave radar sensors 108-1 to 108-4, the controller 216, and the processing circuitry 134 may be configured to control an operation of the vehicle 200. Each of the plurality of millimeter-wave radar sensors 108-1 to 108-4 may be identified with the millimeter-wave radar sensor 108 described above in FIGS. 1A to 1C. Furthermore, in general, the controller 216 and the processing circuitry 134 may be included in an engine control unit (ECU) of the vehicle 200. In such embodiments, the ECU of the vehicle 200 may be electrically and communicatively coupled to each of the plurality of millimeter-wave radar sensors 108-1 to 108-4.

The vehicle 200 may be an automotive vehicle including a cabin 202 and a door 204 that allows ingress to and egress from the cabin 202 of the vehicle 200. In other words, the vehicle 200 may be entered and exited through any of its doors 204. In the example of FIGS. 2A to 2C, the vehicle 200 includes four doors 204. However, in other embodiments, the vehicle 200 may include no more than two doors 204, for example, in embodiments where the vehicle 200 is a coupe or a convertible. Each door 204 of the vehicle 200 includes a major surface 204a that is directed away from the cabin 202. Stated differently, the major surface 204a of each door 204 of the vehicle 200 may form at least a portion of an exterior surface of the vehicle 200. Stated in yet another way, the major surface 204a of each door 204 may face a region that is outside the vehicle 200. In general, the vehicle 200 includes a driver-side door (indicated in FIGS. 2A to 2C as door DSD). The driver-side door DSD allows a driver of the vehicle 200 to enter or exit the vehicle 200. The vehicle 200 also includes a front-passenger-side door (indicated in FIGS. 2A to 2C as door FPSD). The front-passenger-side door FPSD allows a front passenger to enter or exit the vehicle 200.

The vehicle 200 includes a first side-view mirror 206-1 adjacent to the driver-side door DSD, and a second side-view mirror 206-2 adjacent to the front-passenger-side door FPSD. In some embodiments, the side-view mirrors 206-1, 206-2 may be referred to as wing mirrors, door mirrors, or exterior rear-view mirrors. Each of the side-view mirrors 206-1, 206-2 includes a mirrored surface that allows an occupant of the vehicle 200 (e.g. a driver) to view areas behind and to the sides of the vehicle 200, and in some embodiments, such areas may be outside of the viewing occupant's peripheral vision.

In the example shown in FIGS. 2A to 2C, four millimeter-wave radar sensors 108-1 to 108-4 are shown. In particular, the driver-side door DSD, the front-passenger-side door FPSD, the first side-view mirror 206-1, and the second side-view mirror 206-2 are physically coupled to a respective one of the plurality of millimeter-wave radar sensors 108-1 to 108-4. In other embodiments, the number of millimeter-wave radar sensors included in the vehicle 200 may be less than four or greater than four.

Figure 2D:
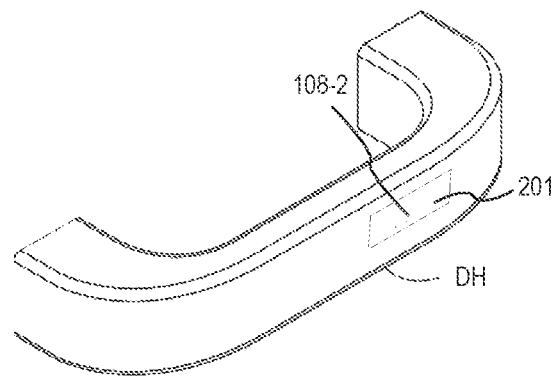
FIG. 2D shows a zoomed-in view of a door handle of the vehicle shown in FIGS. 2A to 2C, in accordance with an embodiment.

In the embodiment shown in FIGS. 2A to 2C, a first millimeter-wave radar sensor 108-1 may be physically coupled to the driver-side door DSD. As an example, the first millimeter-wave radar sensor 108-1 may be disposed within a first door handle that is attached to the major surface 204a of the driver-side door DSD. As illustrated in the example of FIG. 2D, which is a zoomed-in view of the first door handle DH attached to the driver-side door DSD, at least a portion 201 of the first door handle DH is transparent or partially transparent to RF signals transmitted and received by the first millimeter-wave radar sensor 108-1. It should be appreciated that in other embodiments, the first millimeter-wave radar sensor 108-1 may be disposed within a body of the driver-side door DSD, and in such embodiments, at least a portion of the driver-side door DSD overlying the first millimeter-wave radar sensor 108-1 is transparent or partially transparent to RF signals transmitted and received by the first millimeter-wave radar sensor 108-1.

Figure 2E:
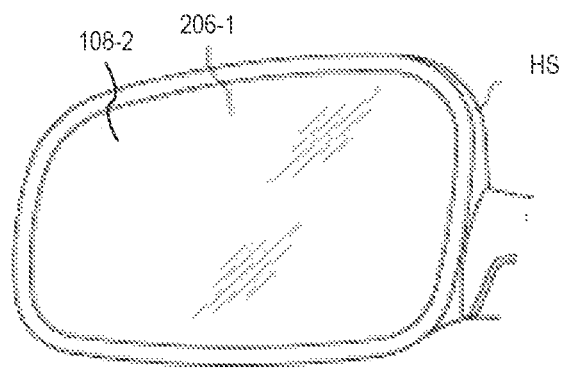
FIG. 2E shows a zoomed-in view of a side-view mirror of the vehicle shown in FIGS. 2A to 2C, in accordance with an embodiment.
Figure 2F:
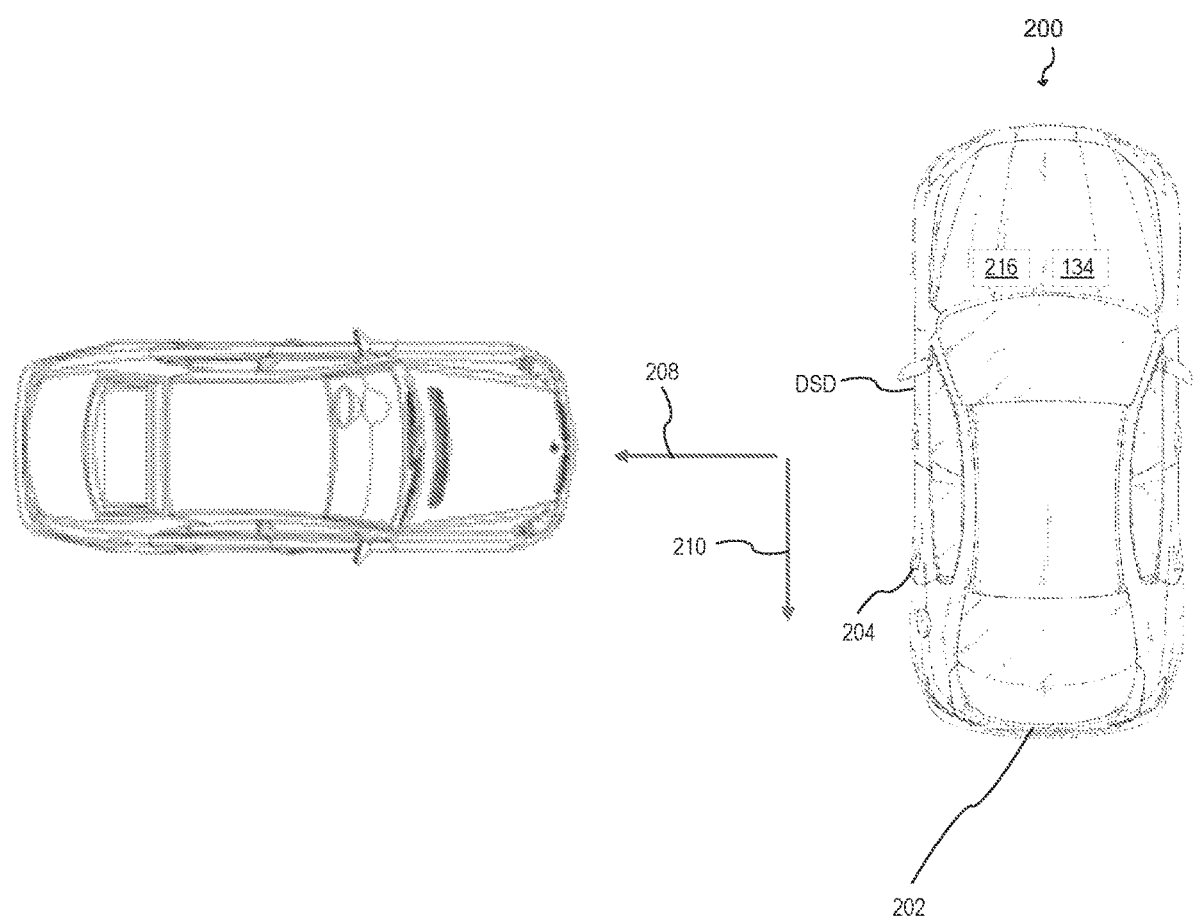
FIGS. 2F and 2G illustrate plan views of objects approaching the vehicle shown in FIGS. 2A to 2C, in accordance with an embodiment.

The first millimeter-wave radar sensor 108-1 may be configured to transmit RF signals 110 in a first principal direction 208, which, in some embodiments, may be perpendicular to the major surface 204a of the driver-side door DSD. In some embodiments, the RF signals 110 transmitted by the first millimeter-wave radar sensor 108-1 may be approximated by a cone of radiation 209 emanating from the first millimeter-wave radar sensor 108-1 and directed in the first principal direction 208. Consequently, the first millimeter-wave radar sensor 108-1 may be configured to produce a first set of radar data indicative of a presence of an object located in proximity to the driver-side door DSD. The first set of radar data may be used (e.g. by the processing circuitry 134) to determine the presence or absence of objects that are facing or approaching the driver-side door DSD or that are located within the gaze or field-of-view of the cone of radiation 209 transmitted from the first millimeter-wave radar sensor 108-1. As an example, as shown in FIG. 2F, the first set of radar data (generated by the first millimeter-wave radar sensor 108-1) may be used (e.g. by the processing circuitry 134) to determine the presence or absence of another vehicle that is facing or approaching the driver-side door DSD of vehicle 200.

In some embodiments, the first millimeter-wave radar sensor 108-1 may be sensitive to objects that are within 2 meters to about 20 meters from the major surface 204a of the driver-side door DSD, although in some embodiments, the first millimeter-wave radar sensor 108-1 may be sensitive to objects that are more than 20 meters from the driver-side door DSD. Such a range of distances may be referred to as a detection range of the first millimeter-wave radar sensor 108-1.

In the embodiment shown in FIGS. 2A to 2C, a second millimeter-wave radar sensor 108-2 may be physically coupled to the first side-view mirror 206-1. As illustrated in the example of FIG. 2E, which is a zoomed-in view of first side-view mirror 206-1, the second millimeter-wave radar sensor 108-2 may be disposed within a housing HS of the first side-view mirror 206-1. In some embodiments, at least a portion of the mirrored surface of the first side-view mirror 206-1 may be transparent or partially transparent to RF signals transmitted and received by the second millimeter-wave radar sensor 108-2.

Figure 2G:
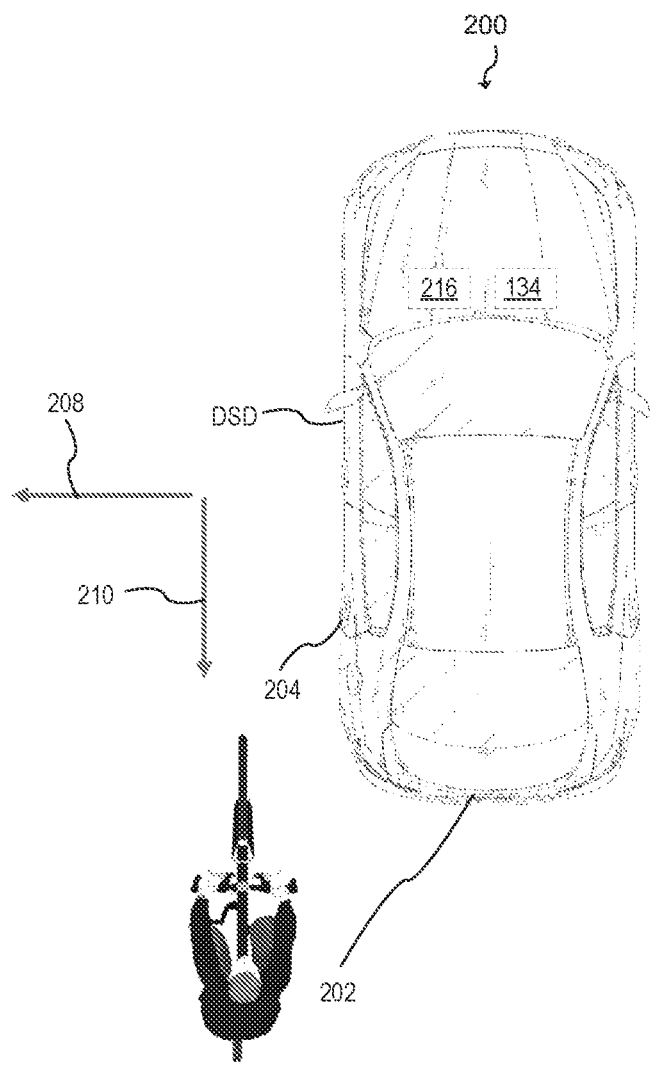

The second millimeter-wave radar sensor 108-2 may be configured to transmit RF signals 110 in a second principal direction 210, which, in some embodiments, may be perpendicular to the first principal direction 208. In some embodiments, the RF signals 110 transmitted by the second millimeter-wave radar sensor 108-2 may be approximated by a cone of radiation 211 emanating from the second millimeter-wave radar sensor 108-2 and directed in the second principal direction 210. Consequently, the second millimeter-wave radar sensor 108-2 may be configured to produce a second set of radar data indicative of a presence of an object located in proximity to the first side-view mirror 206-1. The second set of radar data may be used (e.g. by the processing circuitry 134) to determine the presence or absence of objects that are facing or approaching the first side-view mirror 206-1 or that are located within the gaze or field-of-view of the cone of radiation 211 transmitted from the second millimeter-wave radar sensor 108-2. In some embodiments, the detection range of the second millimeter-wave radar sensor 108-2 may be similar to the detection range of the first millimeter-wave radar sensor 108-1. As an example, as shown in FIG. 2G, the second set of radar data (generated by the second millimeter-wave radar sensor 108-2) may be used (e.g. by the processing circuitry 134) to determine the presence or absence of a cyclist that is approaching the first side-view mirror 206-1 of vehicle 200.

In the embodiment shown in FIGS. 2A to 2C, a third millimeter-wave radar sensor 108-3 may be physically coupled to the front-passenger-side door FPSD. As an example, the third millimeter-wave radar sensor 108-3 may be disposed within a second door handle that is attached to the major surface 204a of the front-passenger-side door FPSD. In such an embodiment, and similar to the embodiment illustrated in FIG. 2D, at least a portion of the second door handle is transparent or partially transparent to RF signals transmitted and received by the third millimeter-wave radar sensor 108-3. It should be appreciated that in other embodiments, the third millimeter-wave radar sensor 108-3 may be disposed within a body of the front-passenger-side door FPSD, and in such embodiments, at least a portion of the front-passenger-side door FPSD overlying the third millimeter-wave radar sensor 108-3 is transparent or partially transparent to RF signals transmitted and received by the third millimeter-wave radar sensor 108-3.

The third millimeter-wave radar sensor 108-3 may be configured to transmit RF signals 110 in a third principal direction 212, which, in some embodiments, may be perpendicular to the major surface 204a of the front-passenger-side door FPSD. In some embodiments, the RF signals 110 transmitted by the third millimeter-wave radar sensor 108-3 may be approximated by a cone of radiation 213 emanating from the third millimeter-wave radar sensor 108-3 and directed in the third principal direction 212. Consequently, the third millimeter-wave radar sensor 108-3 may be configured to produce a third set of radar data indicative of a presence of an object located in proximity to the front-passenger-side door FPSD. The third set of radar data may be used (e.g. by the processing circuitry 134) to determine the presence or absence of objects that are facing or approaching the front-passenger-side door FPSD or that are located within the gaze or field-of-view of the cone of radiation 213 transmitted from the third millimeter-wave radar sensor 108-3. The detection range of the third millimeter-wave radar sensor 108-3 may be similar to the detection range of the first millimeter-wave radar sensor 108-1.

In the embodiment shown in FIGS. 2A to 2C, a fourth millimeter-wave radar sensor 108-4 may be physically coupled to the second side-view mirror 206-2. As an example, the fourth millimeter-wave radar sensor 108-4 may be disposed within a housing of the second side-view mirror 206-2, in a manner similar to the example shown in FIG. 2E. In some embodiments, at least a portion of the mirrored surface of the second side-view mirror 206-2 may be transparent or partially transparent to RF signals transmitted and received by the fourth millimeter-wave radar sensor 108-4.

The fourth millimeter-wave radar sensor 108-4 may be configured to transmit RF signals 110 in a fourth principal direction 214, which, in some embodiments, may be perpendicular to the third principal direction 212. In some embodiments, the RF signals 110 transmitted by the fourth millimeter-wave radar sensor 108-4 may be approximated by a cone of radiation 215 emanating from the fourth millimeter-wave radar sensor 108-4 and directed in the fourth principal direction 214. Consequently, the fourth millimeter-wave radar sensor 108-4 may be configured to produce a fourth set of radar data indicative of a presence of an object located in proximity to the second side-view mirror 206-2. The fourth set of radar data may be used (e.g. by the processing circuitry 134) to determine the presence or absence of objects that are facing or approaching the second side-view mirror 206-2 or that are located within the gaze or field-of-view of the cone of radiation 215 transmitted from the fourth millimeter-wave radar sensor 108-4. The detection range of the fourth millimeter-wave radar sensor 108-4 may be similar to the detection range of the second millimeter-wave radar sensor 108-2.

As described above in reference to FIGS. 1A to 1C, the millimeter-wave radar sensor 108 may be coupled to processing circuitry 134, which acquires baseband signals provided by radar circuitry 136 of the millimeter-wave radar sensor 108 and performs one or more signal processing steps to evaluate them. In a similar manner, the processing circuitry 134 shown in FIGS. 2A to 2C is configured to process the baseband signals provided by the radar circuitry 136 of each of the plurality of millimeter-wave radar sensors 108-1 to 108-4. The processing circuitry 134 may be included in the on-board computer of the vehicle 200 and may be configured to determine the presence or absence of an object facing or approaching any one of, or any combination of, the driver-side door DSD, the front-passenger-side door FPSD, the first side-view mirror 206-1, or the second side-view mirror 206-2. In some embodiments, in response to a determination that an object is approaching the vehicle 200, the processing circuitry 134 may classify or assign a label to the object (e.g. as a pedestrian, bicycle, motorcycle, or car). Such determinations may be made by signal processing steps, including target classification, machine learning, and the like, which are described in further detail below in reference to FIGS. 4 and 5.

The vehicle 200 includes a controller 216 coupled to the processor 134. The controller 216 may also be included in the on-board computer of the vehicle 200. The result of the determination by the processing circuitry 134 may be used by the controller 216 to perform an action on the vehicle 200, such as locking or unlocking the driver-side door DSD or the front-passenger-side door FPSD, deploying the vehicle's airbags, alerting an emergency response team in an event of an impending collision with an object approaching the vehicle 200, or a combination thereof. In other words, each of the plurality of millimeter-wave radar sensors 108-1 to 108-4, in combination with the processing circuitry 134 and the controller 216, may form an in-vehicle system that may be configured to control an operation of the vehicle 200.

In some embodiments, the plurality of millimeter-wave radar sensors 108-1 to 108-4 may be selectively enabled or disabled by the controller 216. As such, the controller 216 is further coupled to each of the plurality of millimeter-wave radar sensors 108-1 to 108-4, and the controller 216 may be configured to enable one of the millimeter-wave radar sensors 108-1 to 108-4 at any given time, while disabling others of the plurality of millimeter-wave radar sensors 108-1 to 108-4. Such selective enabling or disabling of the plurality of millimeter-wave radar sensors 108-1 to 108-4 may be in response to various vehicle parameters, such as a speed of the vehicle 200, whether the engine of the vehicle 200 is running or switched off, or a combination thereof. Additionally or alternatively, such selective enabling or disabling of the plurality of millimeter-wave radar sensors 108-1 to 108-4 may be based on whether the driver-side of the vehicle 200 or the passenger-side of the vehicle 200 is being monitored for the presence or absence of facing or approaching objects. Examples of methods of selectively enabling and disabling the plurality of millimeter-wave radar sensors 108-1 to 108-4 are described next in reference to FIGS. 3A to 3D.

FIGS. 3A to 3D show flow charts illustrating methods of selectively enabling and disabling the plurality of millimeter-wave radar sensors 108-1 to 108-4, in accordance with various embodiments. In general, the methods depicted in FIGS. 3A to 3D selectively enable and disable the plurality of millimeter-wave radar sensors 108-1 to 108-4 based on whether the vehicle 200 is stationary and whether an engine of the vehicle 200 is switched off. The methods shown in FIGS. 3A to 3D may be performed by the controller 216.

Figure 3A:
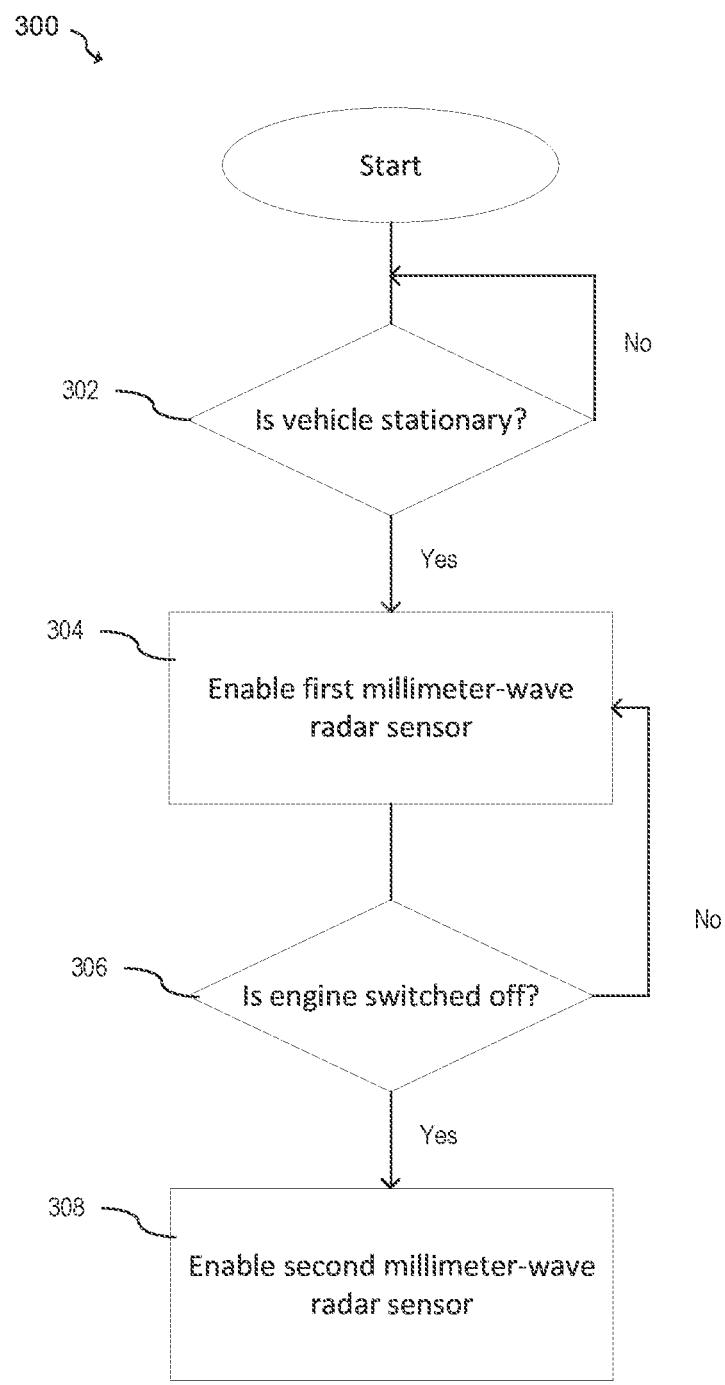
FIGS. 3A to 3D show flow charts illustrating methods of selectively enabling and disabling the plurality of millimeter-wave radar sensors shown in FIGS. 2A to 2C, in accordance with various embodiments.

FIG. 3A shows a flow chart of a method 300 for selectively enabling and disabling the first millimeter-wave radar sensor 108-1 and the second millimeter-wave radar sensor 108-2, in accordance with an embodiment. The method 300 may be executed in embodiments where the processing circuitry 134 determines the presence or absence of objects that are facing or approaching the driver-side of the vehicle 200 (e.g. the driver-side door DSD, the first side-view mirror 206-1, or both). Illustratively, in FIG. 3A, the first millimeter-wave radar sensor 108-1 is enabled when the vehicle 200 is stationary and has its engine switched on, while the second millimeter-wave radar sensor 108-2 is enabled when the vehicle 200 is stationary and has its engine switched off.

As depicted in FIG. 3A, the method 300 includes determining (e.g. by the controller 216) whether the vehicle 200 is stationary (e.g. in step 302). The vehicle 200 may be stationary when it has stopped at a traffic signal, is parked, or is in traffic. It is noted that in step 302, the engine of the vehicle 200 is still running. In response to a determination that the vehicle 200 is stationary with its engine running, the first millimeter-wave radar sensor 108-1 may be enabled by the controller 216 (e.g. in step 304). In some embodiments, the second millimeter-wave radar sensor 108-2 is disabled when the first millimeter-wave radar sensor 108-1 is enabled. Enabling the first millimeter-wave radar sensor 108-1 may cause the processing circuitry 134 to determine whether there is an object facing or approaching the driver-side door DSD. As an example, when the vehicle 200 is at a traffic signal or is in traffic, such a determination may reveal whether a sideway collision is imminent (e.g. from an oncoming vehicle approaching the driver-side door DSD), and, in response to such a determination, the controller 216 may deploy the vehicle's airbags, or alert an emergency response team. Alternatively or additionally, when the vehicle 200 is parked, such a determination may reveal whether the vehicle 200 is located too close to a stationary object (e.g. another parked car or a wall), and, in response to such a determination, the controller 216 may alert the occupant of the vehicle 200 of the presence of the stationary object.

Method 300 also includes determining (e.g. by the controller 216) whether the engine of the vehicle 200 is switched off (e.g. in step 306). The engine of the vehicle 200 may be switched off when the driver is parked or ready to exit the vehicle 200. In response to a determination that the engine of the vehicle 200 is switched off, the second millimeter-wave radar sensor 108-2 may be enabled by the controller 216 (e.g. in step 308). In some embodiments, the first millimeter-wave radar sensor 108-1 is disabled when the second millimeter-wave radar sensor 108-2 is enabled. Enabling the second millimeter-wave radar sensor 108-2 may cause the processing circuitry 134 to determine whether there is an object facing or approaching the first side-view mirror 206-1. As an example, when the driver is parked and ready to exit the vehicle 200, such a determination may reveal whether a pedestrian, cyclist, or vehicle is approaching the first side-view mirror 206-1 or a blind spot of the driver, and, in response to such a determination, the controller 216 may lock or disable the driver-side door DSD so as to prevent the driver from opening the driver-side door DSD and causing injury or damage to the approaching pedestrian, cyclist, or vehicle.

Figure 3B:
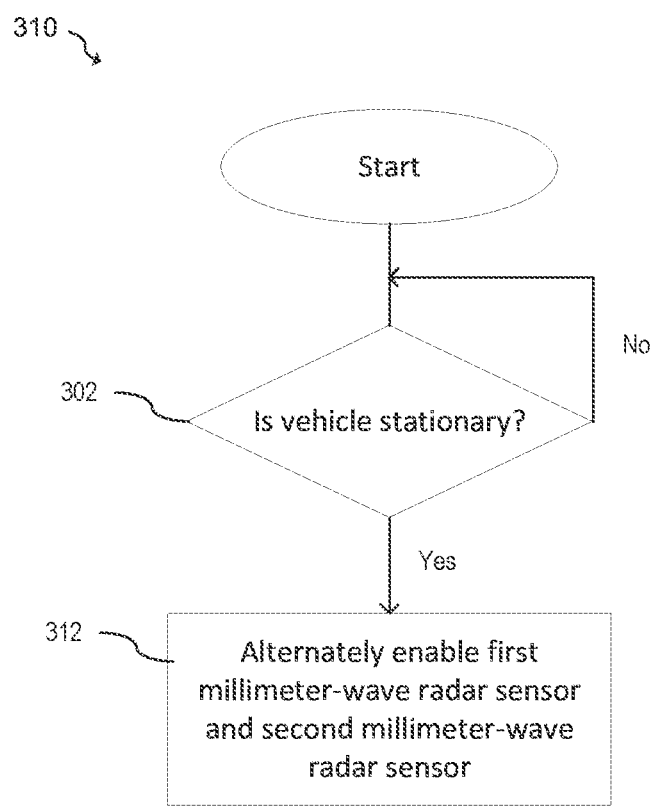

FIG. 3B shows a flow chart of a method 310 for selectively enabling and disabling the first millimeter-wave radar sensor 108-1 and the second millimeter-wave radar sensor 108-2, in accordance with another embodiment. Method 310 differs from the method 300 depicted in FIG. 3A in that in response to a determination (e.g. by the controller 216) that the engine of the vehicle 200 is switched off, the first millimeter-wave radar sensor 108-1 and the second millimeter-wave radar sensor 108-2 are alternately enabled (e.g. in step 312). The method 310 shown in FIG. 3B may be advantageous in scenarios where the driver has stopped the vehicle, has left the engine running, but needs to exit the vehicle 200 for a short time (e.g. to help an elderly passenger enter the vehicle 200). In some embodiments, the first millimeter-wave radar sensor 108-1 and the second millimeter-wave radar sensor 108-2 may be alternately enabled (e.g. by the ECU of the vehicle 200) every 1 millisecond to every 20 milliseconds. Since both the first millimeter-wave radar sensor 108-1 and the second millimeter-wave radar sensor 108-2 are enabled (albeit alternately) after the engine of the vehicle 200 is switched off (e.g. when the driver is parked and ready to exit the vehicle 200), step 312 in the method 310 reveals whether a pedestrian, cyclist, or vehicle is approaching the first side-view mirror 206-1 or a blind spot of the driver and also whether the vehicle 200 is located too close to a stationary object (e.g. another parked car or a wall).

Figure 3C:
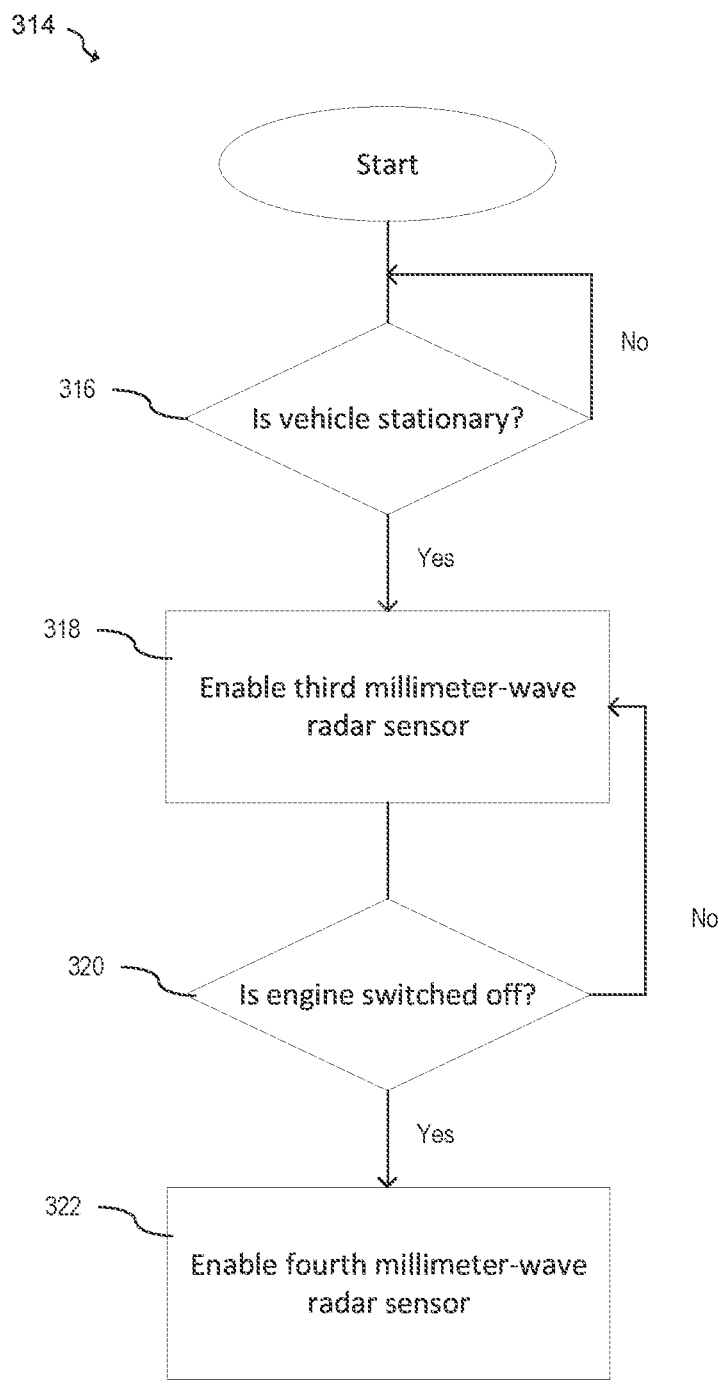

FIG. 3C shows a flow chart of a method 314 for selectively enabling and disabling the third millimeter-wave radar sensor 108-3 and the fourth millimeter-wave radar sensor 108-4, in accordance with an embodiment. The method 314 may be executed in embodiments where the processing circuitry 134 determines the presence or absence of objects that are facing or approaching the front-passenger-side of the vehicle 200 (e.g. the front-passenger-side door FPSD, the second side-view mirror 206-2, or both). Illustratively, in FIG. 3C, the third millimeter-wave radar sensor 108-3 is enabled when the vehicle 200 is stationary and has its engine switched on, while the fourth millimeter-wave radar sensor 108-4 is enabled when the vehicle 200 is stationary and has its engine switched off.

As depicted in FIG. 3C, the method 314 includes determining (e.g. by the controller 216) whether the vehicle 200 is stationary (e.g. in step 316). The vehicle 200 may be stationary when it has stopped at a traffic signal, is parked, or is in traffic. It is noted that in step 316, the engine of the vehicle 200 is still running. In response to a determination that the vehicle 200 is stationary with its engine running, the third millimeter-wave radar sensor 108-3 may be enabled by the controller 216 (e.g. in step 318). In some embodiments, the fourth millimeter-wave radar sensor 108-4 is disabled when the third millimeter-wave radar sensor 108-3 is enabled. Enabling the third millimeter-wave radar sensor 108-3 may cause the processing circuitry 134 to determine whether there is an object facing or approaching the front-passenger-side door FPSD. As an example, when the vehicle 200 is at a traffic signal or is in traffic, such a determination may reveal whether a sideway collision is imminent (e.g. from an oncoming vehicle approaching the front-passenger-side door FPSD), and, in response to such a determination, the controller 216 may deploy the vehicle's airbags, or alert an emergency response team. Alternatively or additionally, when the vehicle 200 is parked, such a determination may reveal whether the vehicle 200 is located too close to a stationary object (e.g. another parked car or a wall), and, in response to such a determination, the controller 216 may alert the occupant of the vehicle 200 of the presence of the stationary object.

Method 314 also includes determining (e.g. by the controller 216) whether the engine of the vehicle 200 is switched off (e.g. in step 320). The engine of the vehicle 200 may be switched off when the front-passenger is ready to exit the vehicle 200. In response to a determination that the engine of the vehicle 200 is switched off, the fourth millimeter-wave radar sensor 108-4 may be enabled by the controller 216 (e.g. in step 322). In some embodiments, the third millimeter-wave radar sensor 108-3 is disabled when the fourth millimeter-wave radar sensor 108-4 is enabled. Enabling the fourth millimeter-wave radar sensor 108-4 may cause the processing circuitry 134 to determine whether there is an object facing or approaching the second side-view mirror 206-2. As an example, when the front-passenger is ready to exit the vehicle 200, such a determination may reveal whether a pedestrian, cyclist, or vehicle is approaching the second side-view mirror 206-2 or a blind spot of the front-passenger, and, in response to such a determination, the controller 216 may lock or disable the front-passenger-side door FPSD so as to prevent the front-passenger from opening the front-passenger-side door FPSD and causing injury or damage to the approaching pedestrian, cyclist, or vehicle.

Figure 3D:
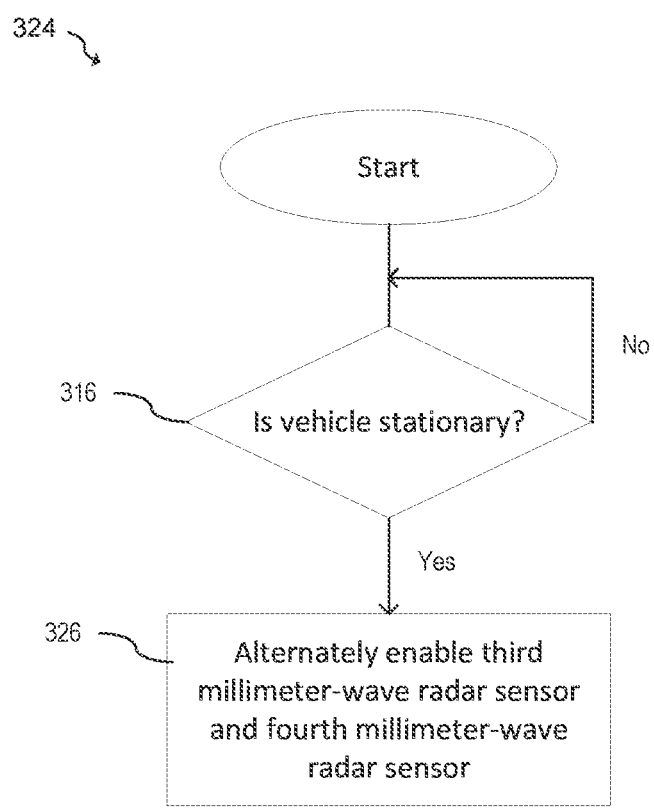

FIG. 3D shows a flow chart of a method 324 for selectively enabling and disabling the third millimeter-wave radar sensor 108-3 and the fourth millimeter-wave radar sensor 108-4, in accordance with another embodiment. Method 324 differs from the method 314 depicted in FIG. 3C in that in response to a determination (e.g. by the controller 216) that the vehicle 200 is stationary, the third millimeter-wave radar sensor 108-3 and the fourth millimeter-wave radar sensor 108-4 are alternately enabled (e.g. in step 326). In some embodiments, the third millimeter-wave radar sensor 108-3 and the fourth millimeter-wave radar sensor 108-4 may be alternately enabled (e.g. by the ECU of the vehicle 200) every 1 millisecond to every 20 milliseconds. The method shown in FIG. 3D may be useful in scenarios where a driver stops a location to drop off or pick up a passenger, without turning off the engine of the vehicle 200. In comparison to the method 314 shown in FIG. 3C, in method 324, both the third millimeter-wave radar sensor 108-3 and the fourth millimeter-wave radar sensor 108-4 are enabled (albeit alternately) after the vehicle 200 comes to a stop (e.g. when the front-passenger is ready to exit or enter the vehicle 200). Consequently, step 326 in the method 324 reveals whether a pedestrian, cyclist, or vehicle is approaching the second side-view mirror 206-2 or a blind spot of the front-passenger and also whether the vehicle 200 is located too close to a stationary object (e.g. another parked car or a wall).

As mentioned above in reference to FIGS. 3A to 3D, enabling of the first millimeter-wave radar sensor 108-1, the second millimeter-wave radar sensor 108-2, the third millimeter-wave radar sensor 108-3, or the fourth millimeter-wave radar sensor 108-4 may cause the processing circuitry 134 to respectively determine whether there is an object facing or approaching the driver-side door DSD, the first side-view mirror 206-1, the front-passenger-side door FPSD, or the second side-view mirror 206-2. Such determinations may be made by signal processing steps, including target classification, machine learning, and the like, which are described in further detail below in reference to FIGS. 4 and 5.

Figure 4:
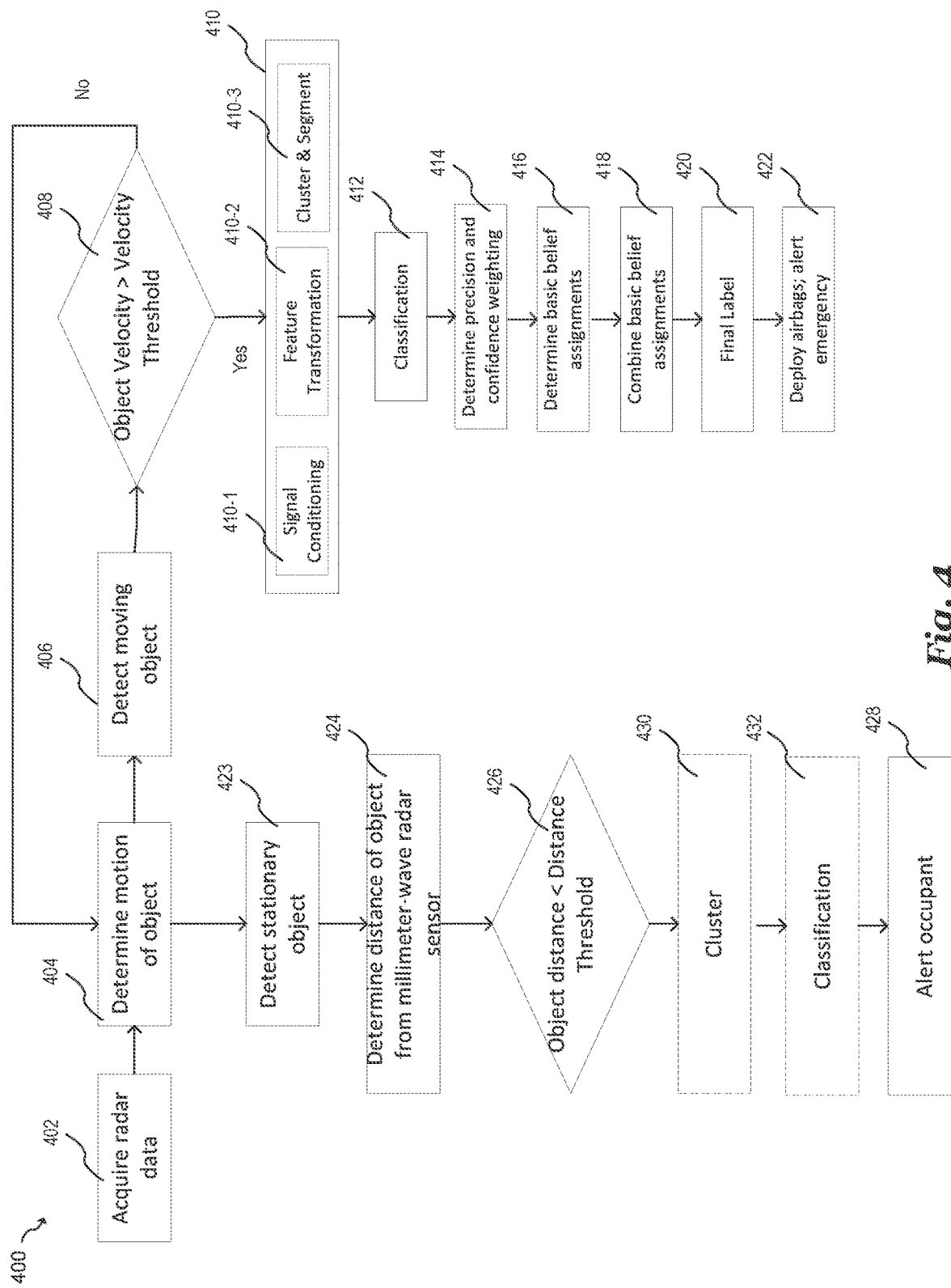
FIG. 4 shows a method of determining whether there is an object facing or approaching a door of a vehicle, in accordance with an embodiment.

FIG. 4 shows a method 400 of determining whether there is an object facing or approaching a door 204 of the vehicle 200 (e.g. the driver-side door DSD or the front-passenger-side door FPSD), in accordance with an embodiment. The method 400 may be performed by the first millimeter-wave radar sensor 108-1 and the processing circuitry 134 in response to the first millimeter-wave radar sensor 108-1 being enabled (e.g. by the controller 216). The method 400 may also be performed by the third millimeter-wave radar sensor 108-3 and the processing circuitry 134 in response to the third millimeter-wave radar sensor 108-3 being enabled (e.g. by the controller 216). In the description that follows, method 400 is described with reference to the first millimeter-wave radar sensor 108-1. However, it is noted that the method 400 may be performed analogously with reference to the third millimeter-wave radar sensor 108-3.

In step 402, processing circuitry 134 acquires radar data provided by radar circuitry 136 of the first millimeter-wave radar sensor 108-1. In step 404, using the radar data, the processing circuitry 134 determines a motion of an object that is located within the detection range of the first millimeter-wave radar sensor 108-1. In some embodiments, Doppler analysis of the radar data may be performed to determine the motion of the object. In embodiments that utilize a frequency modulated continuous wave (FMCW) radar sensor, the location of the object may be found by taking a range FFT of the baseband radar signal produced by the first millimeter-wave radar sensor 108-1, and the motion of the object may be determined, for example, by taking a further FFTs to determine the object's velocity using Doppler analysis techniques known in the art. In embodiments where the first millimeter-wave radar sensor 108-1 includes a receive antenna array, further FFTs may also be used to determine the azimuth of the object with respect to the first millimeter-wave radar sensor 108-1. In some embodiments, a two-dimensional FFT may be taken of a range FFT over slow-time to determine the velocity of the object. Alternatively, the velocity of the object may be determined by other waveform techniques including, but not limited to triangular chirp and staggered pulse repetition time (PRT).

In response to a determination that a moving object is located in the detection range of the first millimeter-wave radar sensor 108-1, the method 400 proceeds to steps 406 and 408. In step 408, the processing circuitry 134 compares the velocity of the object against a velocity threshold, which may be between 5 m/s and 20 m/s. It is noted that the velocity may be a radial velocity of the object, namely, a velocity at which the object is approaching the first millimeter-wave radar sensor 108-1 and/or the major surface 204a of the driver-side door DSD. A determination that the velocity of the object is less than the velocity threshold may indicate that the object is slowing down or that the object does not seem likely to collide with the vehicle 200. In such a scenario, the method 400 may revert back to step 404. However, a determination that the velocity of the object is greater than the velocity threshold may indicate that is some likelihood that the object may collide with the vehicle. Consequently, in response to a determination that the velocity of the object is greater than the velocity threshold, the method 400 proceeds to step 410, where signal pre-processing is performed by the processing circuitry 134 on the radar data. In some embodiments, signal pre-processing step 410 includes a step 410-1 of signal conditioning, a step 410-2 of feature transformation, and a step 410-3 of clustering and segmenting.

In signal conditioning step 410-1, radar data from the first millimeter-wave radar sensor 108-1 is filtered, DC components are removed, and interference data is cleared (e.g. by filtering to remove the transmitter-receiver self-interference and optionally pre-filtering the interference colored noise). In some embodiments, filtering the radar data from the first millimeter-wave radar sensor 108-1 includes removing data outliers that have significantly different values from other neighboring measurements, and in a specific example, a Hampel filter may be applied with a sliding time window to remove such outliers, although other filters may be used in other embodiments.

In feature transformation step 410-2, the radar data may be converted to range-Doppler data (e.g. a range-Doppler map) according to methods known in the art. As such, in step 410-2, the processing circuitry 134 may transform the radar data into the range-Doppler domain, since such a domain allows the processing circuitry 134 to efficiently determine how far away the approaching object is and how quickly the object is approaching the vehicle 200. The range-Doppler domain also allows the processing circuitry 134 to distinguish among objects moving at various speeds and at various ranges.

In clustering and segmenting step 410-3, regions of interests (ROIs) of the range-Doppler map obtained from step 410-2 may be clustered and segmented. As an example, when high-resolution radar is used, such as the embodiment millimeter-wave first millimeter-wave radar sensor 108-1, a single object might be resolved into multiple ranges. In step 410-3, these multiple ranges are clustered together, thereby grouping adjacent or nearest neighbor ranges. Such clustering of the detected ranges or azimuths helps prevents the resolution a single object into multiple targets. Furthermore, in step 410-3, targets regions are identified and segmented from the range-Doppler map.

Following signal pre-processing in step 410, method 400 proceeds to step 412, where the identified and segmented target regions are processed by a classifier in order to determine the identity of the approaching object. In some embodiments, the classifier in step 412 may operate on the range-Doppler data (e.g. the clustered and segmented range-Doppler map. from step 410-3). In some embodiments, in step 412, the range-Doppler map is input to a machine learning algorithm such as, but not limited to, a random forest algorithm, adaptive boosting (AdaBoost) algorithm and/or a neural network algorithm in order to identify the type of object approaching the vehicle 200. In some embodiments, the object approaching the door 204 of the vehicle 200 may be classified (e.g. instantaneously classified) as being a motorcycle, an automobile, a bicycle, or a pedestrian.

In step 414, a precision and a confidence weighting of the classifier used in step 412 is determined (e.g. by the processing circuitry 134). In some embodiments, the precision and the confidence weighting (e.g. for a given label) are set by a developer of the classifier, and in such embodiments, the processing circuitry 134 may simply read the precision of the classifier used in step 412.

In step 416, the confidence weighting and the precision determined in step 414 are used to calculate basic belief assignments corresponding to each classification determined in step 412. A respective basic belief assignment may be equal to the respective confidence weighting multiplied by the precision of the classifier and the result may be expressed as a belief vector.

In step 418, the basic belief assignments calculated in step 416 are combined using techniques known in the art, examples being a conjunctive rule of combination, a random forest, a neural net and/or a mergence based on the Dempster-Shafer theory. The result of step 418 is a determination of a final label for the object approaching the door 204 of the vehicle 200 (e.g. depicted in step 420). In some cases, the approaching object may be finally labelled as a motorcycle or an automobile (e.g. instead of a bicycle or a pedestrian). Such a result may indicate an impending collision with the vehicle 200. Consequently, in response to the final label of the object being a motorcycle or an automobile, the processing circuitry 134 may provide a control signal to the controller 216 that triggers the controller 216 to deploy the vehicle's airbags and/or alert an emergency response team. (in step 422) In some embodiments, the control signal may further trigger the controller 216 to turn off the engine of the vehicle 200.

Consequently, based on the above-described sequence of steps, the operation of the vehicle 200 is controlled (e.g. deploying of airbags and/or alerting of emergency response team) by the in-vehicle system formed by the first millimeter-wave radar sensor 108-1, the processing circuitry 134, and the controller 216 in an event of an impending collision of an approaching object with the vehicle 200.

Referring back to step 404, in some embodiments, the result of step 404 may be a determination that the object in the detection range of the first millimeter-wave radar sensor 108-1 is a static object. In such cases, the method 400 proceeds to steps 423 and 424. In step 424, the distance of the static object from the first millimeter-wave radar sensor 108-1 is determined (e.g. using the above-identified methods of Doppler analysis of the radar data). In step 426, the distance determined in step 424 is compared against a distance threshold, which may be a minimum distance required to open the door 204 so as to allow comfortable and/or safe ingress into or egress from the cabin 202. In some embodiments, the distance threshold may be between 60 cm and 120 cm (e.g. about 100 cm). In response to a determination that the distance of the static object from the first millimeter-wave radar sensor 108-1 is less than the distance threshold, the method 400 may proceed to step 428 in which the occupant of the vehicle 200 is alerted. In some embodiments, the method 400 may include optional steps 430 and 432. In step 430, the range-Doppler data (e.g. determined in step 424) may be clustered (e.g. using methods discussed above in reference to step 410-3). In step 432, the clustered range-Doppler data may be processed by a classifier in order to determine the identity of the static object. In some embodiments, the static object may be identified as another parked car or a wall or similar obstruction, and such an identification may be provided to the occupant of the vehicle 200 in step 428. Consequently, based on the above-described sequence of steps, the operation of the vehicle 200 is controlled (e.g. alerting of the occupant) by the in-vehicle system formed by the first millimeter-wave radar sensor 108-1, the processing circuitry 134, and the controller 216 in an event of a static object being located too close to a door 204 of the vehicle 200.

Figure 5:
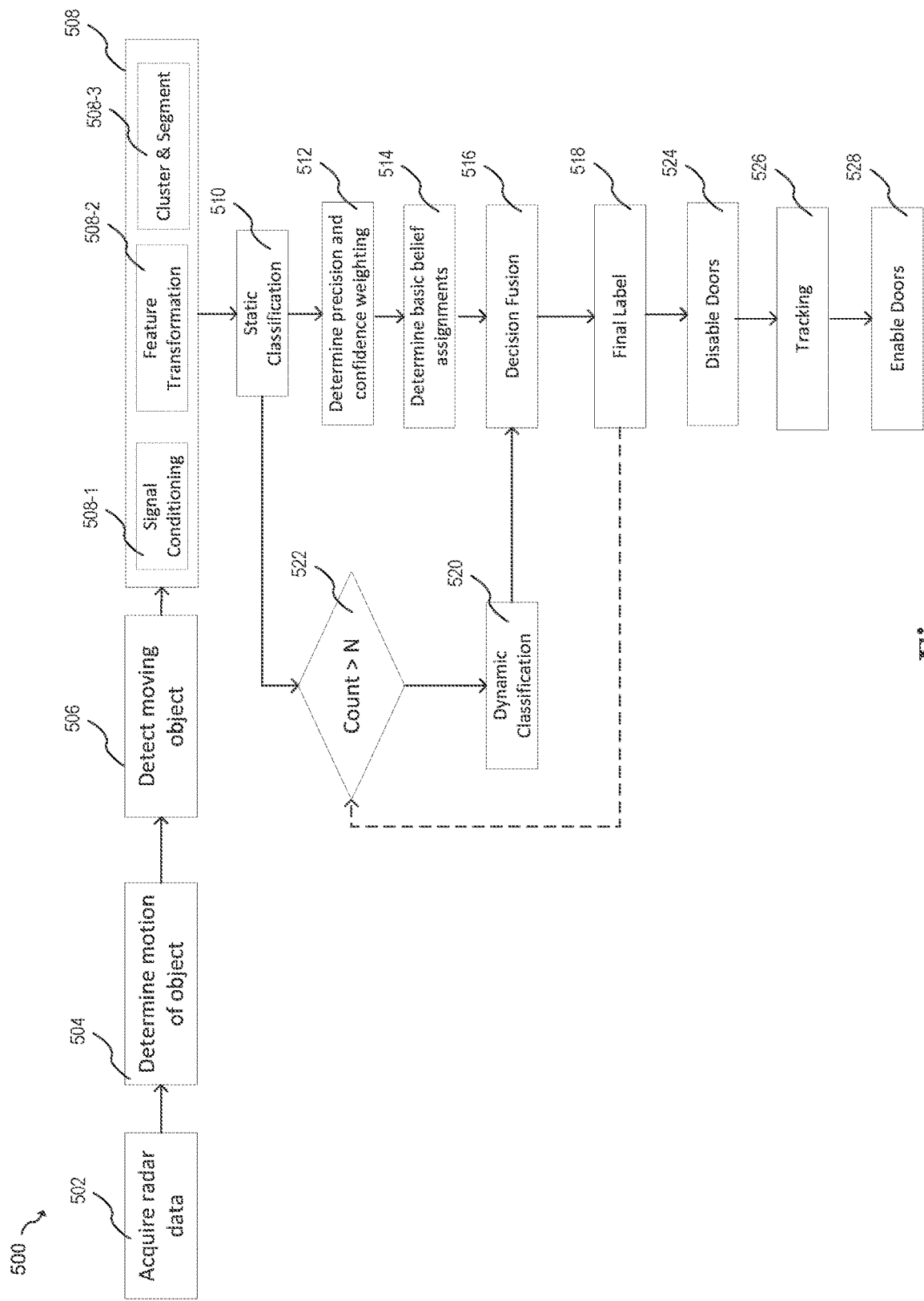
FIG. 5 shows a method of determining whether there is an object facing or approaching a side-view mirror of a vehicle, in accordance with an embodiment.

FIG. 5 shows a method 500 of determining whether there is an object facing or approaching a side-view mirror of the vehicle 200 (e.g. the first side-view mirror 206-1 adjacent to the driver-side door DSD or the second side-view mirror 206-2 adjacent to the front-passenger-side door FPSD), in accordance with an embodiment. The method 500 may be performed by the third millimeter-wave radar sensor 108-3 and the processing circuitry 134 in response to the third millimeter-wave radar sensor 108-3 being enabled (e.g. by the controller 216). The method 500 may also be performed by the fourth millimeter-wave radar sensor 108-4 and the processing circuitry 134 in response to the fourth millimeter-wave radar sensor 108-4 being enabled (e.g. by the controller 216). In the description that follows, method 500 is described with reference to the third millimeter-wave radar sensor 108-3. However, it is noted that the method 500 may be performed analogously with reference to the fourth millimeter-wave radar sensor 108-4.

In step 502, processing circuitry 134 acquires radar data provided by radar circuitry 136 of the third millimeter-wave radar sensor 108-3. In step 504, using the radar data, the processing circuitry 134 determines a motion of an object that is located within the detection range of the third millimeter-wave radar sensor 108-3 (e.g. using the Doppler analysis of the radar data described above in reference to step 404 of method 400). In response to a determination that a moving object is located in the detection range of the third millimeter-wave radar sensor 108-3, the method 500 proceeds to steps 506 and 508. Step 508 may be similar to step 410 described above in respect of method 400. For example, in step 508, signal pre-processing is performed by the processing circuitry 134 on the radar data. In some embodiments, signal pre-processing step 508 includes a step 508-1 of signal conditioning (analogous to step 410-1 in method 400), a step 508-2 of feature transformation (analogous to step 410-2 in method 400), and a step 508-3 of clustering and segmenting (analogous to step 410-3 in method 400).

Following signal pre-processing in step 508, method 500 proceeds to step 510, where the identified and segmented target regions are processed by a classifier in order to determine the identity of the approaching object. In this regard, the classifier in step 510 may be a static classifier, namely, a classifier that uses a single range-Doppler map (e.g. the most recent range-Doppler map from step 508). The classifier in step 510 may be similar to the classifier described above in reference to step 412 of method 400. In some embodiments, the object approaching the side-view mirror of the vehicle 200 may be classified (e.g. instantaneously classified) as being a motorcycle, an automobile, a bicycle, or a pedestrian.

In the event that the classification provided by the step 510 is based on the first range-Doppler map generated by the method 500, the method 500 proceeds to step 512, where a precision and a confidence weighting of the classifier used in step 510 is determined (e.g. using the method discussed above in respect of step 414). In step 514, the confidence weighting and the precision determined in step 512 are used to calculate basic belief assignments corresponding to each classification determined in step 510 (e.g. using the methods discussed above in respect of step 416). Subsequently, the method 500 proceeds to step 516, where the basic belief assignments calculated in step 514 are combined (e.g. using techniques discussed above in respect of step 418). The result of step 516 is a determination of a final label for the object approaching the side-mirror of the vehicle 200 (e.g. depicted in step 518). The final label may indicate that the object is a motorcycle, an automobile, a bicycle, or a pedestrian.

In an initial run of the method 500, the final label that is initially assigned to the object approaching the side-view mirror of the vehicle 200 may be used to determine an initial number N of range-Doppler maps that may be used by a dynamic classifier (e.g. in step 520 of method 500). Such a dependence of the maximum number N of range-Doppler maps on the final label is indicated as a dotted arrow between steps 518 and 522. The maximum number N of range-Doppler maps that may be used by the dynamic classifier in step 520 may depend on the labelling provided by step 518. For example, the maximum number N of range-Doppler maps that may be used by the dynamic classifier in step 520 may depend on whether the object is initially labelled in step 518 as a being a pedestrian, a bicycle, a motorcycle, or an automobile. In general, the maximum number N of range-Doppler maps that may be used by the dynamic classifier decreases as the attainable speed of the object increases.

Consequently, as long as the number of range-Doppler maps generated by step 508 is less than the maximum number N of range-Doppler maps that may be used by the dynamic classifier (e.g. in step 522), method 500 also includes a dynamic classifying step 520 where a plurality of range-Doppler maps (e.g. stitched together sequentially in time) are used to identify the object approaching the side-view mirror of the vehicle 200. In some embodiments, the dynamic classifier in step 520 may execute similar methods as described above with reference to step 412 of method 400, except that, in step 520, such methods are performed on a plurality of time-sequential range-Doppler maps. Following the setting of the maximum number N of range-Doppler maps that may be used by the dynamic classifier, step 516 combines the result of step 520 and the basic belief assignments calculated in step 514 to update the final label provided to the object (e.g. in step 518).

Method 500 proceeds with step 524, where the processing circuitry 134 provides a control signal to the controller 216 that triggers the controller 216 to disable (e.g. lock) the doors 204 of the vehicle 200. In so doing, the occupant of the vehicle 200 is prevented from opening the door 204 of the vehicle 200 and causing injury or damage to the approaching pedestrian, cyclist, or vehicle. Method 500 also includes step 526, where the third millimeter-wave radar sensor 108-3 continues to track the object approaching the side-view mirror of the vehicle 200. Step 526 may be performed using the above-identified methods of Doppler analysis of the radar data. In response to a determination that the approaching object is out of the detection range of the third millimeter-wave radar sensor 108-3, the method 500 may proceed to step 528 where the processing circuitry 134 provides a control signal to the controller 216 that triggers the controller 216 to enable (e.g. unlock) the doors 204 of the vehicle 200 so as to allow the occupant to exit the vehicle 200 safely. Consequently, based on the above-described sequence of steps for method 500, the operation of the vehicle 200 is controlled (e.g. locking or unlocking of the doors 204) by the in-vehicle system formed by the third millimeter-wave radar sensor 108-3, the processing circuitry 134, and the controller 216 in response to a detection that an object is approaching the side-view mirror of the vehicle 200.

Figure 6:
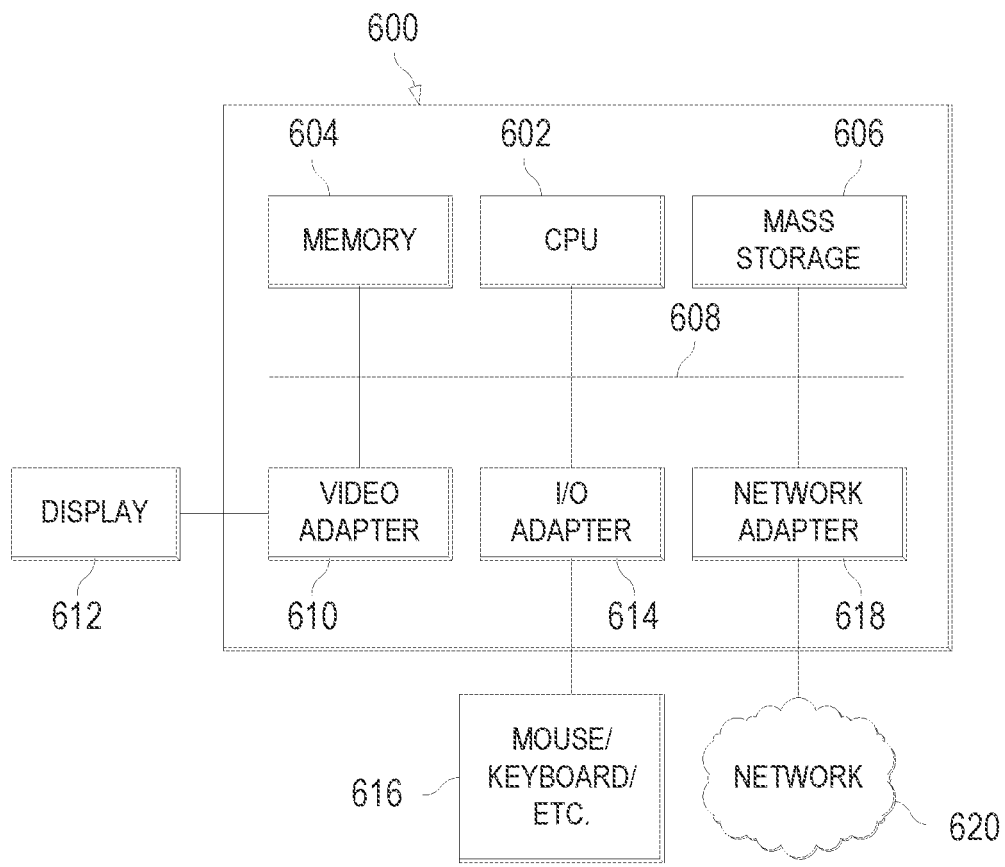
FIG. 6 illustrates a block diagram of a processing system that may be used to implement portions of embodiment systems.

Referring now to FIG. 6, a block diagram of a processing system 600 is provided in accordance with an embodiment of the present invention. The processing system 600 depicts a general-purpose platform and the general components and functionality that may be used to implement portions of the embodiment occupancy detection system and/or an external computer or processing device interfaced to the embodiment occupancy detection system. The processing system 600 may include, for example, a central processing unit (CPU) 602, memory 604, and a mass storage device 606 connected to a bus 608 configured to perform the processes discussed above. The processing system 600 may further include, if desired or needed, a video adapter 610 to provide connectivity to a local display 612 and an input-output (I/O) Adapter 614 to provide an input/output interface for one or more input/output devices 616, such as a mouse, a keyboard, printer, tape drive, CD drive, or the like.

The processing system 600 also includes a network interface 618, which may be implemented using a network adaptor configured to be coupled to a wired link, such as an Ethernet cable, USB interface, or the like, and/or a wireless/cellular link for communications with a network 620. The network interface 618 may also comprise a suitable receiver and transmitter for wireless communications. It should be noted that the processing system 600 may include other components. For example, the processing system 600 may include power supplies, cables, a motherboard, removable storage media, cases, and the like. These other components, although not shown, are considered part of the processing system 600.

Based on the above-described embodiments, it is seen that a radar-based detection system is included in a vehicle to determine the presence or absence of an object located outside the vehicle. In some embodiments, the object may be an animate object (e.g. a human) that is mobile or stationary. In other embodiments, the object may be an inanimate object (e.g. controlled by a human) that is mobile (e.g. a bicycle, a motorcycle, or another vehicle). In yet other embodiments, the object may be an inanimate object that is stationary (e.g. a wall or a stationary vehicle). The radar-based detection system may control an operation of the vehicle based on a determination, by the radar-based detection system, of whether an object is located outside the vehicle. Advantages of the embodiment radar-based detection system include, for example, the ability of the radar-based detection system to alert an occupant of the vehicle that an object is located outside the vehicle and to intervene, for example, to mitigate or prevent harm to the occupant, the vehicle, and the object. Such intervention by the radar-based detection system may be accomplished by controlling an operation of the vehicle, examples being locking or unlocking the vehicle's doors (e.g. to prevent harm to the occupant, the object, and the vehicle), deploying the vehicle's airbags (e.g. to mitigate or prevent harm to the occupant), alerting an emergency response team in an event of an impending collision with the object (e.g. to mitigate or prevent harm to the occupant, the object, and the vehicle), or a combination thereof. The embodiment radar-based detection system is also independent of human perception, lighting conditions, and changes in environmental conditions (e.g. humidity or weather) since radar-based sensing is employed by the radar-based detection system. The embodiment radar-based detection system is also configured to perform long-range detection of objects situated outside the vehicle so as to provide sufficient time for the radar-based detection system to provide an alert to the occupant of the vehicle and to intervene by controlling the vehicle's operation, if necessary.

Example embodiments of the invention are summarized here. Other embodiments can also be understood from the entirety of the specification and claims filed herein.

In accordance with an embodiment, a system may include a first millimeter-wave radar sensor coupled to a driver-side door of a vehicle, the first millimeter-wave radar sensor being configured to produce a first set of radar data indicative of a presence of an object within a first field of view. The system may also include a second millimeter-wave radar sensor coupled to a side-view mirror of the vehicle adjacent to the driver-side door, the second millimeter-wave radar sensor being configured to produce a second set of radar data indicative of a presence of the object within a second field of view. The system further includes a processing circuit coupled to the first millimeter-wave radar sensor and the second millimeter-wave radar sensor, and a controller coupled to the processing circuit, the first millimeter-wave radar sensor, and the second millimeter-wave radar sensor, the controller being configured to control an operation of the vehicle based on a control signal provided to the controller by the processing circuit. In some embodiments, the processing circuit may be configured to determine whether the object is approaching the driver-side door based on the first set of radar data; and determine whether the object is approaching the side-view mirror based on the second set of radar data.

In accordance with an embodiment, a method may include generating, by a first millimeter-wave radar sensor coupled to a driver-side door of a vehicle, a first set of radar data indicative of a presence of an object within a first field of view. The method further includes generating, by a second millimeter-wave radar sensor coupled to a side-view mirror of the vehicle adjacent to the driver-side door, a second set of radar data indicative of a presence of the object within a second field of view. The method also includes determining, by a processing circuit coupled to the first millimeter-wave radar sensor and the second millimeter-wave radar sensor, whether the object is approaching the driver-side door based on the first set of radar data; and determining, by the processing circuit, whether the object is approaching the side-view mirror based on the second set of radar data. The method additionally includes controlling, by a controller coupled to the processing circuit, the first millimeter-wave radar sensor, and the second millimeter-wave radar sensor, an operation of the vehicle based on a control signal provided to the controller by the processing circuit.

In accordance with an embodiment, an executable program stored on a non-transitory computer readable storage medium includes instructions to: generate, using a first millimeter-wave radar sensor coupled to a driver-side door of a vehicle, a first set of radar data indicative of a presence of an object within a first field of view; generate, using a second millimeter-wave radar sensor coupled to a side-view mirror of the vehicle adjacent to the driver-side door, a second set of radar data indicative of a presence of the object within a second field of view; determine, using a processing circuit coupled to the first millimeter-wave radar sensor and the second millimeter-wave radar sensor, whether the object is approaching the driver-side door based on the first set of radar data; determine, using the processing circuit, whether the object is approaching the side-view mirror based on the second set of radar data; and control, using a controller coupled to the processing circuit, the first millimeter-wave radar sensor, and the second millimeter-wave radar sensor, an operation of the vehicle based on a control signal provided to the controller by the processing circuit.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. For example, the embodiments described in FIGS. 1-8 may be combined with each other in various embodiments. It is therefore intended that the appended claims encompass any such modifications or embodiments.

What is claimed is:

1. A system, comprising:
   a first millimeter-wave radar sensor coupled to a driver-side door of a vehicle, the first millimeter-wave radar sensor configured to produce a first set of radar data indicative of a presence of an object within a first field of view;
   a second millimeter-wave radar sensor coupled to a side-view mirror of the vehicle adjacent to the driver-side door, the second millimeter-wave radar sensor configured to produce a second set of radar data indicative of a presence of the object within a second field of view;

a processing circuit coupled to the first millimeter-wave radar sensor and the second millimeter-wave radar sensor, the processing circuit configured to:
determine whether the object is approaching the driver-side door based on the first set of radar data; and
determine whether the object is approaching the side-view mirror based on the second set of radar data; and
a controller coupled to the processing circuit, the first millimeter-wave radar sensor, and the second millimeter-wave radar sensor, the controller configured to control an operation of the vehicle based on a control signal provided to the controller by the processing circuit, wherein the controller is further configured to alternatingly enable the first millimeter-wave radar sensor and the second millimeter-wave radar sensor in response to the vehicle being stationary.

2. The system of claim 1, wherein the controller is configured to lock the driver-side door of the vehicle in response to the processing circuit determining that the object is approaching the side-view mirror.

3. The system of claim 1, wherein the processing circuit is further configured to classify the object based on a classification algorithm, and wherein the controller is configured to deploy airbags of the vehicle in response to the processing circuit classifying the object as another vehicle and determining that the another vehicle is approaching the driver-side door.

4. The system of claim 3, wherein the controller is configured to deploy the airbags of the vehicle in response to a velocity of the another vehicle being greater than a velocity threshold.

5. The system of claim 4, wherein the velocity threshold is between 5 meters per second and 20 meters per second.

6. The system of claim 1, wherein the first millimeter-wave radar sensor and the second millimeter-wave radar sensor are alternatingly enabled every 1 millisecond to every 20 milliseconds.

7. The system of claim 1, wherein the controller is further configured to enable the first millimeter-wave radar sensor and disable the second millimeter-wave radar sensor in response to an engine of the vehicle being switched on and the vehicle being stationary.

8. The system of claim 7, wherein the controller is further configured to enable the second millimeter-wave radar sensor and disable the first millimeter-wave radar sensor in response to the engine of the vehicle being switched off.

9. The system of claim 1, wherein the first field of view is perpendicular to the second field of view.

10. A method, comprising:
generating, by a first millimeter-wave radar sensor coupled to a driver-side door of a vehicle, a first set of radar data indicative of a presence of an object within a first field of view;
generating, by a second millimeter-wave radar sensor coupled to a side-view mirror of the vehicle adjacent to the driver-side door, a second set of radar data indicative of a presence of the object within a second field of view;
determining, by a processing circuit coupled to the first millimeter-wave radar sensor and the second millimeter-wave radar sensor, whether the object is approaching the driver-side door based on the first set of radar data;
determining, by the processing circuit, whether the object is approaching the side-view mirror based on the second set of radar data;

controlling, by a controller coupled to the processing circuit, the first millimeter-wave radar sensor, and the second millimeter-wave radar sensor, an operation of the vehicle based on a control signal provided to the controller by the processing circuit; and
alternatingly enabling the first millimeter-wave radar sensor and the second millimeter-wave radar sensor in response to the vehicle being stationary.

11. The method of claim 10, wherein determining whether the object is approaching the driver-side door based on the first set of radar data comprises:
converting the first set of radar data to a first range-Doppler data;
determining a velocity of the object based on the first range-Doppler data; and
determining that the object is approaching the driver-side door in response to the velocity of the object being greater than a velocity threshold.

12. The method of claim 11, further comprising:
classifying the object based on a classification algorithm; and
deploying airbags of the vehicle in response to the object being identified as another vehicle.

13. The method of claim 10, wherein determining whether the object is approaching the side-view mirror based on the second set of radar data comprises:
converting the second set of radar data to a second range-Doppler data;
determining whether the object is in motion based on the second range-Doppler data; and
disabling the driver-side door in response to a determination that the object is in motion.

14. The method of claim 10, further comprising enabling the first millimeter-wave radar sensor and disabling the second millimeter-wave radar sensor in response to an engine of the vehicle being switched on and the vehicle being stationary.

15. A non-transitory computer readable storage medium with an executable program stored thereon, the executable program including instructions to:
generate, using a first millimeter-wave radar sensor coupled to a driver-side door of a vehicle, a first set of radar data indicative of a presence of an object within a first field of view;
generate, using a second millimeter-wave radar sensor coupled to a side-view mirror of the vehicle adjacent to the driver-side door, a second set of radar data indicative of a presence of the object within a second field of view;
determine, using a processing circuit coupled to the first millimeter-wave radar sensor and the second millimeter-wave radar sensor, whether the object is approaching the driver-side door based on the first set of radar data;
determine, using the processing circuit, whether the object is approaching the side-view mirror based on the second set of radar data; and
control, using a controller coupled to the processing circuit, the first millimeter-wave radar sensor, and the second millimeter-wave radar sensor, an operation of the vehicle based on a control signal provided to the controller by the processing circuit; and
alternatingly enable the first millimeter-wave radar sensor and the second millimeter-wave radar sensor in response to the vehicle being stationary.

16. The non-transitory computer readable storage medium of claim 15, wherein determining whether the object is approaching the driver-side door based on the first set of radar data comprises converting the first set of radar data to a first range-Doppler data; determining a velocity of the object based on the first range-Doppler data; determining that the object is approaching the driver-side door in response to the velocity of the object being greater than a velocity threshold; classifying the object based on a classification algorithm; and deploying airbags of the vehicle in response to the object being identified as another vehicle.

17. The non-transitory computer readable storage medium of claim 15, wherein determining whether the object is approaching the side-view mirror based on the second set of radar data comprises converting the second set of radar data to a second range-Doppler data; determining whether the object is in motion based on the second range-Doppler data; and locking the driver-side door in response to a determination that the object is in motion.

18. A system, comprising:
  a first millimeter-wave radar sensor coupled to a driver-side door of a vehicle, the first millimeter-wave radar sensor configured to produce a first set of radar data indicative of a presence of an object within a first field of view;
  a second millimeter-wave radar sensor coupled to a side-view mirror of the vehicle adjacent to the driver-side door, the second millimeter-wave radar sensor configured to produce a second set of radar data indicative of a presence of the object within a second field of view;
  a processing circuit coupled to the first millimeter-wave radar sensor and the second millimeter-wave radar sensor, the processing circuit configured to:
  determine whether the object is approaching the driver-side door based on the first set of radar data; and
  determine whether the object is approaching the side-view mirror based on the second set of radar data; and
  a controller coupled to the processing circuit, the first millimeter-wave radar sensor, and the second millimeter-wave radar sensor, the controller configured to control an operation of the vehicle based on a control signal provided to the controller by the processing circuit, wherein the controller is further configured to enable the first millimeter-wave radar sensor and disable the second millimeter-wave radar sensor in response to an engine of the vehicle being switched on and the vehicle being stationary.

19. A method, comprising:
  generating, by a first millimeter-wave radar sensor coupled to a driver-side door of a vehicle, a first set of radar data indicative of a presence of an object within a first field of view;
  generating, by a second millimeter-wave radar sensor coupled to a side-view mirror of the vehicle adjacent to the driver-side door, a second set of radar data indicative of a presence of the object within a second field of view;
  determining, by a processing circuit coupled to the first millimeter-wave radar sensor and the second millimeter-wave radar sensor, whether the object is approaching the driver-side door based on the first set of radar data;
  determining, by the processing circuit, whether the object is approaching the side-view mirror based on the second set of radar data;
  controlling, by a controller coupled to the processing circuit, the first millimeter-wave radar sensor, and the second millimeter-wave radar sensor, an operation of the vehicle based on a control signal provided to the controller by the processing circuit; and
  enabling the first millimeter-wave radar sensor and disabling the second millimeter-wave radar sensor in response to an engine of the vehicle being switched on and the vehicle being stationary.

20. A method, comprising:
  generating, by a first millimeter-wave radar sensor coupled to a driver-side door of a vehicle, a first set of radar data indicative of a presence of an object within a first field of view;
  generating, by a second millimeter-wave radar sensor coupled to a side-view mirror of the vehicle adjacent to the driver-side door, a second set of radar data indicative of a presence of the object within a second field of view;
  determining, by a processing circuit coupled to the first millimeter-wave radar sensor and the second millimeter-wave radar sensor, whether the object is approaching the driver-side door based on the first set of radar data;
  determining, by the processing circuit, whether the object is approaching the side-view mirror based on the second set of radar data;
  classifying the object comprising:
    performing a static classification of the object based on a first range-Doppler map to form a first classifier,
    determining a maximum number N of range-Doppler maps based on the static classifier or a velocity of the object,
    performing a dynamic classification of the object using up the maximum number N of range-Doppler maps, and
    performing a decision fusion of the static classification and the dynamic classification;
  generating a control signal based on performing the decision fusion; and
  controlling, by a controller coupled to the processing circuit, the first millimeter-wave radar sensor, and the second millimeter-wave radar sensor, an operation of the vehicle based on the control signal.

* * * * *